US012054891B1

(12) United States Patent
Sylvester

(10) Patent No.: US 12,054,891 B1
(45) Date of Patent: Aug. 6, 2024

(54) SYSTEMS AND COMPUTER-IMPLEMENTED METHODS FOR ANALYZING TRANSFER OF FORCE THROUGH PAVEMENT SLABS

(71) Applicant: Integrated Roadways, LLC, Chicago, IL (US)

(72) Inventor: Tim Sylvester, Raytown, MO (US)

(73) Assignee: Integrated Roadways, LLC, Kansas City, MO (US)

( * ) Notice: Subject to any disclaimer, the term of this patent is extended or adjusted under 35 U.S.C. 154(b) by 0 days.

(21) Appl. No.: 17/851,163

(22) Filed: Jun. 28, 2022

Related U.S. Application Data

(63) Continuation of application No. 17/471,470, filed on Sep. 10, 2021, which is a continuation-in-part of
(Continued)

(51) Int. Cl.
*E01C 11/00* (2006.01)
*E01C 5/00* (2006.01)
(Continued)

(52) U.S. Cl.
CPC ............. *E01C 11/00* (2013.01); *E01C 5/005* (2013.01); *G01G 3/125* (2013.01); *G01G 19/022* (2013.01);
(Continued)

(58) Field of Classification Search
CPC ...... E01C 11/00; E01C 5/005; E01C 2201/00; G01G 3/125; G01G 19/022; G01G 19/025;
(Continued)

(56) References Cited

U.S. PATENT DOCUMENTS 8,919,057 B1 * 12/2014 Dupray ................ E04B 5/36
52/223.6
2016/0084733 A1 * 3/2016 Wu ...................... G01M 11/083
29/458
(Continued)

FOREIGN PATENT DOCUMENTS

EP          0135374 A2 *  8/1984  ............... E04C 2/26

OTHER PUBLICATIONS

Google Fiber's Biggest Failure: ISP will turn service off in Louisville article https://arstechnica.com/information-technology/2019/02/google-fiber-exits-louisville-after-.(Feb. 8, 2019).
(Continued)

*Primary Examiner* — Brandi N Hopkins
*Assistant Examiner* — Nigel H Plumb

(57) ABSTRACT

A modular pavement slab comprises a body, a strain sensor array, and a sensor processor. The body includes a top surface, a bottom surface, and four side surfaces. The modular pavement slab is configured to be coupled to at least one other modular pavement slab via connectors along at least one of the side surfaces. The strain sensor array is retained within the body and is configured to detect a plurality of strains on the body resulting from vehicular traffic across the top surface of the body. The sensor processor is in communication with the strain sensor array. The sensor processor is configured to communicate input signals to the strain sensor array, receive output signals from the strain sensor array, and determine a plurality of time-varying strain values, each strain value indicating a strain experienced over time by a successive one of a plurality of regions of the body.

20 Claims, 13 Drawing Sheets

Related U.S. Application Data application No. 17/226,159, filed on Apr. 9, 2021, now Pat. No. 11,692,315, which is a continuation of application No. 16/528,024, filed on Jul. 31, 2019, now Pat. No. 10,995,457, which is a continuation of application No. 15/889,718, filed on Feb. 6, 2018, now Pat. No. 10,407,838.

(60) Provisional application No. 63/076,767, filed on Sep. 10, 2020, provisional application No. 62/594,822, filed on Dec. 5, 2017, provisional application No. 62/455,287, filed on Feb. 6, 2017.

(51) Int. Cl.
```
G01G 3/12      (2006.01)
G01G 19/02     (2006.01)
G01G 19/52     (2006.01)
G01L 1/24      (2006.01)
G01L 17/00     (2006.01)
G01M 5/00      (2006.01)
G01P 3/36      (2006.01)
```
(52) U.S. Cl.
CPC ............ *G01G 19/025* (2013.01); *G01G 19/52* (2013.01); *G01L 1/246* (2013.01); *G01L 17/00* (2013.01); *G01M 5/0041* (2013.01); *G01P 3/36* (2013.01); *E01C 2201/00* (2013.01)

(58) Field of Classification Search
CPC ......... G01G 19/52; G01L 1/246; G01L 17/00; G01M 5/0041; G01P 3/36
See application file for complete search history.

(56) References Cited

U.S. PATENT DOCUMENTS

2017/0306577 A1* 10/2017 Trifan ................... F21S 8/032
2021/0222375 A1*  7/2021 Sylvester ............... G01L 17/00

OTHER PUBLICATIONS

Bao, Tengfei, et al. "Generalized method and monitoring technique for shear-strain-based bridge weigh-in-motion." Journal of Bridge Engineering 21.1 (2016): 04015029.
X. Bao and L. Chen, "Recent progress in distributed fiber optic sensors," sensors, vol. 12, No. 7, pp. 8601-8639, 2012.
Alamandala, Sravanthi, et al. "FBG sensing system to study the bridge weigh-in-motion for measuring the vehicle parameters." 2018 3rd International Conference on Microwave and Photonics (ICMAP). IEEE, 2018.
Bao, Yi, et al. "Temperature measurement and damage detection in concrete beams exposed to fire using PPP-BOTDA based fiber optic sensors." Smart materials and structures 26.10 (2017): 105034.
Batenko, Anatoly, et al. "Weight-in-motion (WIM) measurements by fiber optic sensor: problems and solutions." Transport and Telecommunication 12.4 (2011): 27-33.
Bhatia, Vikram. "Applications of long-period gratings to single and multi-parameter sensing." Optics express 4.11 (1999): 457-466.
Campanella, Carlo Edoardo, et al. "Fibre Bragg grating based strain sensors: review of technology and applications." Sensors 18.9 (2018): 3115.
Chen, Shi-Zhi, et al. "Development of a bridge weigh-in-motion system based on long-gauge fiber Bragg grating sensors." Journal of Bridge Engineering 23.9 (2018): 04018063.
Fajkus, Marcel, et al. "PDMS-FBG-Based Fiber Optic System for Traffic Monitoring in Urban Areas." IEEE Access 8 (2020): 127648-127658.
Grakovski, Alexander, et al. "Weight-in-motion estimation based on reconstruction of tyre footprint's geometry by group of fibre optic sensors." Transport and Telecommunication 15.2 (2014): 97.
Grattan, K. T. V., and T. Sun. "Fiber optic sensor technology: an overview." Sensors and Actuators A: Physical 82.1-3 (2000): 40-61.
Hall, A. J., and C. Minto. "Using fibre optic cables to deliver intelligent traffic management in smart cities." International Conference on Smart Infrastructure and Construction 2019 (ICSIC) Driving data-informed decision-making. ICE Publishing, 2019.
Hartog, Arthur H., Mohammad Belal, and Michael A. Clare. "Advances in distributed fiber-optic sensing for monitoring marine infrastructure, measuring the deep ocean, and quantifying the risks posed by seafloor hazards." Marine Technology Society Journal 52.5 (2018): 58-73.
G. Belitsky, V. Belitsky, and A. Liberson, "Mobile scales for trafficweighing based on optical fiber technology," ICWIM7, p. 26, 2016.
D. M. Karabacak, J. A. O'Dowd, L. J. Hopman, and J. M. Singer,"Asphalt embedded fibre optic weigh-in-motion technology," ICWIM8,p. 185, 2019.
Inaudi, Daniele, and Branko Glisic. "Distributed fiber optic strain and temperature sensing for structural health monitoring." Proceedings of the Third International Conference on Bridge Maintenance, Safety and Management, Porto, Portugal. 2006.
James, Stephen W., and Ralph P. Tatam. "Optical fibre long-period grating sensors: characteristics and application." Measurement science and technology 14.5 (2003): R49.
Liu, Huiyong, et al. "Traffic flow detection using distributed fiber optic acoustic sensing." IEEE Access 6 (2018): 68968-68980.
Lydon, Myra, et al. "Development of a bridge weigh-in-motion sensor: performance comparison using fiber optic and electric resistance strain sensor systems." IEEE Sensors Journal 14.12 (2014): 4284-4296.
Lydon, Myra, et al. "Bridge weigh-in-motion using fibre optic sensors." Proceedings of the Institution of Civil Engineers-Bridge Engineering. vol. 170. No. 3. Thomas Telford Ltd, 2017.
Lydon, Myra, et al. "Recent developments in bridge weigh in motion (B-WIM)." Journal of Civil Structural Health Monitoring 6.1 (2016): 69-81.
Lydon, Myra, et al. "Improved axle detection for bridge weigh-in-motion systems using fiber optic sensors." Journal of Civil Structural Health Monitoring 7.3 (2017): 325-332.
Miliou, Amalia. "In-Fiber Interferometric-Based Sensors: Overview and Recent Advances." Photonics. vol. 8. No. 7. Multidisciplinary Digital Publishing Institute, 2021.
Mimbela, Luz-Elena Y., et al. Applications of fiber optics sensors in weigh-in-motion (WIM) systems for monitoring truck weights on pavements and structures. No. NM97ITD-02. New Mexico. Dept. of Transportation, 2003.
Mollahasani Madjdabadi, Behrad. "Experimental Evaluation of a Distributed Fiber Optic Sensor for Mining Application." (2016).
Optical Sensing Instrumental and Software User Guide—Revision Sep. 30, 2017.
Oskoui, Elias Abdoli. Methods and Applications of Structural Health Monitoring on Bridges. Diss. University of Illinois at Chicago, 2019.
Presti, Daniela Lo, et al. "Fiber bragg gratings for medical applications and future challenges: A review." IEEE Access 8 (2020): 156863-156888.
Al-Tarawneh, Mu'ath Ahmad. "In-pavement fiber Bragg grating sensors for weight-in-motion measurements." (2016).
Tosi, D., et al. "Weigh-in-motion through fibre Bragg grating optical sensors." Electronics letters 46.17 (2010): 1223-1225.
Yuksel, Kivilcim, et al. "Implementation of a mobile platform based on fiber bragg grating sensors for automotive traffic monitoring." Sensors 20.6 (2020): 1567.
G. Nosenzo, B. Whelan, M. Brunton, D. Kay, and H. Buys, "Continuous monitoring of mining induced strain in a road pavement using fiber bragg grating sensors," Photonic Sensors, vol. 3, No. 2, pp. 144-158, 2013.

* cited by examiner

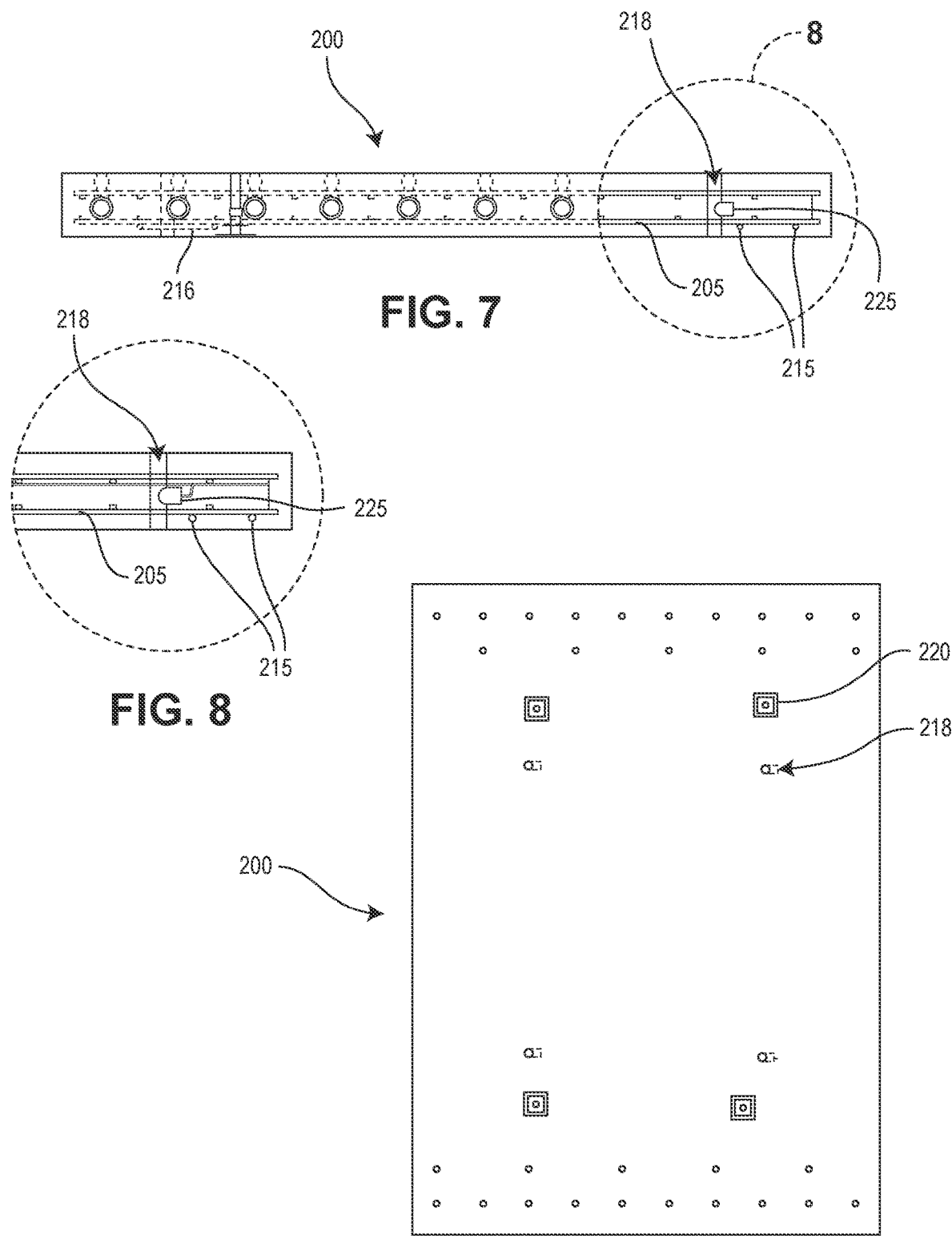

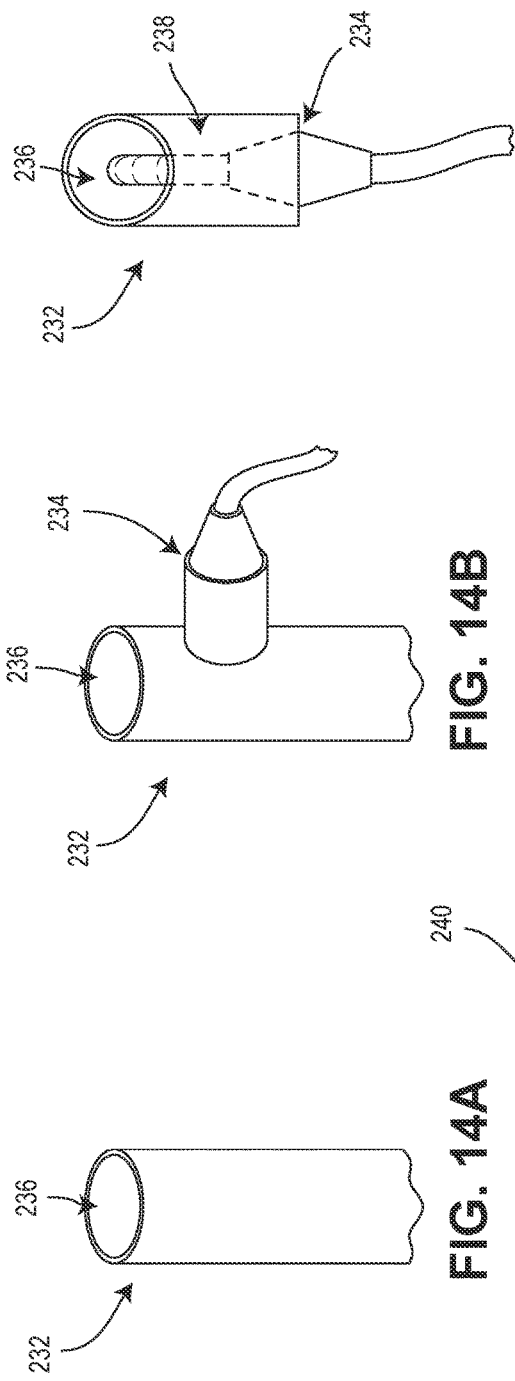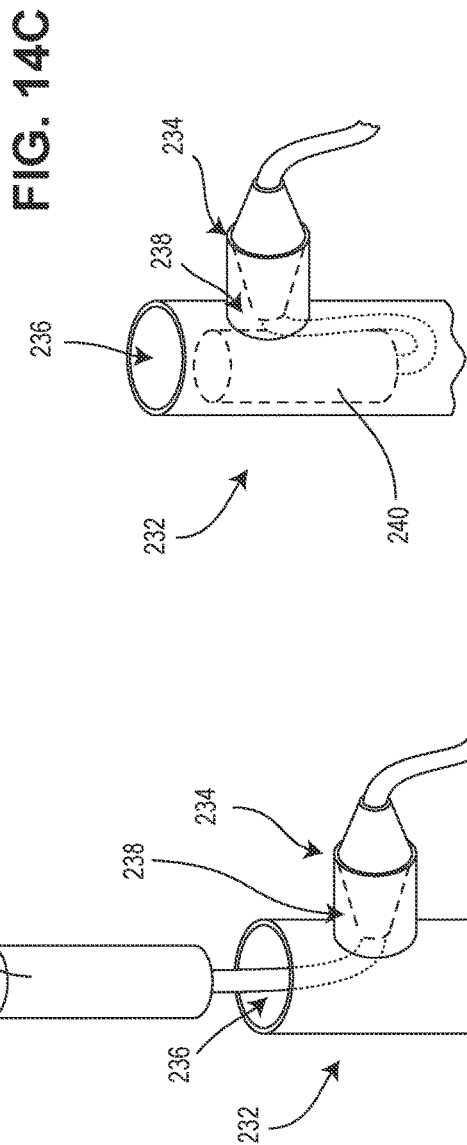

SYSTEMS AND COMPUTER-IMPLEMENTED METHODS FOR ANALYZING TRANSFER OF FORCE THROUGH PAVEMENT SLABS

RELATED APPLICATIONS

The present application is a continuation of U.S. patent application Ser. No. 17/471,470, filed on Sep. 10, 2021, and entitled SYSTEMS AND COMPUTER-IMPLEMENTED METHODS FOR ANALYZING TRANSFER OF FORCE THROUGH PAVEMENT SLABS, which, in turn, is a continuation-in-part of U.S. patent application Ser. No. 17/226,159, filed on Apr. 9, 2021, and entitled MODULAR PAVEMENT SLAB, which, in turn, is a continuation of U.S. patent application Ser. No. 16/528,024, filed Jul. 31, 2019 (now U.S. Pat. No. 10,995,457) and entitled MODULAR PAVEMENT SLAB, which, in turn, is a continuation of U.S. patent application Ser. No. 15/889,718, filed Feb. 6, 2018 (now U.S. Pat. No. 10,407,838) and entitled MODULAR PAVEMENT SLAB, which, in turn, claims priority benefit to U.S. Patent Application Ser. No. 62/594,822, filed on Dec. 5, 2017, and entitled PAVEMENT, as well as to U.S. Patent Application Ser. No. 62/455,287, filed on Feb. 6, 2017, and entitled PAVEMENT, and the present application additionally claims priority to U.S. Patent Application Ser. No. 63/076,767, filed Sep. 10, 2020, and entitled MODULAR PAVEMENT SLAB. The entirety of each of the above-identification applications is hereby incorporated by reference into the present patent application.

BACKGROUND OF THE INVENTION

Field of the Invention

This invention relates generally to the field of pavement systems and, in particular, to a pre-fabricated, modular pavement slab equipped for embedded self-monitoring of form and integrity.

Description of the Related Art

Pre-fabricated, modular pavement slabs have traditionally offered an attractive alternative to continuous pour systems at least because they can be individually removed, repaired and/or replaced with relative ease. Traditional continuous pour systems require significantly more time and/or money for removal and replacement.

However, pre-fabricated, modular pavement slab systems have untapped potential for enabling focused, quick and low-cost maintenance and/or repair. For instance, defect detection for the slab and/or sub-grade is still overwhelmingly performed using the same traditional tools used in continuous pour systems. A serviceable modular pavement slab is needed to improve the longevity and usefulness of such alternatives to continuous pour systems.

BRIEF SUMMARY

An embodiment of the modular pavement slab comprises a body, a strain sensor array, and a sensor processor. The body includes a top surface. The strain sensor array is retained within the body and is configured to detect a plurality of strains on the body resulting from vehicular traffic across the top surface of the body. The sensor processor is in communication with the strain sensor array. The sensor processor is configured to communicate input signals to the strain sensor array, receive output signals from the strain sensor array, and determine a plurality of time-varying strain values, each strain value indicating a strain experienced over time by a successive one of a plurality of regions of the body.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 7 is a front view of the self-monitoring modular pavement slab of FIG. 6, partially sectioned along a line bisecting a grout port within a limited field of view corresponding to FIG. 8 and illustrating fiber optic sensing cables attached to the bottom reinforcement mat;

FIG. 8 is the detailed cross-sectional view of the grout port within a limited field of view of FIG. 7, illustrating the grout port extending between top and bottom sides of the slab for fluid communication between top and bottom surfaces of the slab and provision of access to a terminal of an ethernet cable embedded in the slab;

FIG. 9 is a top view of the self-monitoring modular pavement slab of FIG. 6, detailing exemplary dimensions and positions of grout ports and lifting elements of the slab;

FIG. 14A is a partial front view of an internal sidewall of a self-monitoring modular pavement slab defining a vertical cavity of an expansion port within a body of the slab according to embodiments of the present invention;

FIG. 14B is a partial side view of the expansion port of FIG. 14A, illustrating a horizontal cavity and connector terminal of the expansion port;

FIG. 14C is a bottom view of the expansion port of FIG. 14A, illustrating a cable attached to the connector terminal establishing electronic communication between the cable and an internal cable also terminated at the connector terminal;

FIG. 14D is a partial side view of the expansion port of FIG. 14C, additionally illustrating an expansion module attached to and in electronic communication with the cable; and FIG. 14E is a partial side view of the expansion port of FIG. 14D, illustrating the expansion module inserted into the vertical cavity of the expansion port.

Figure 1:
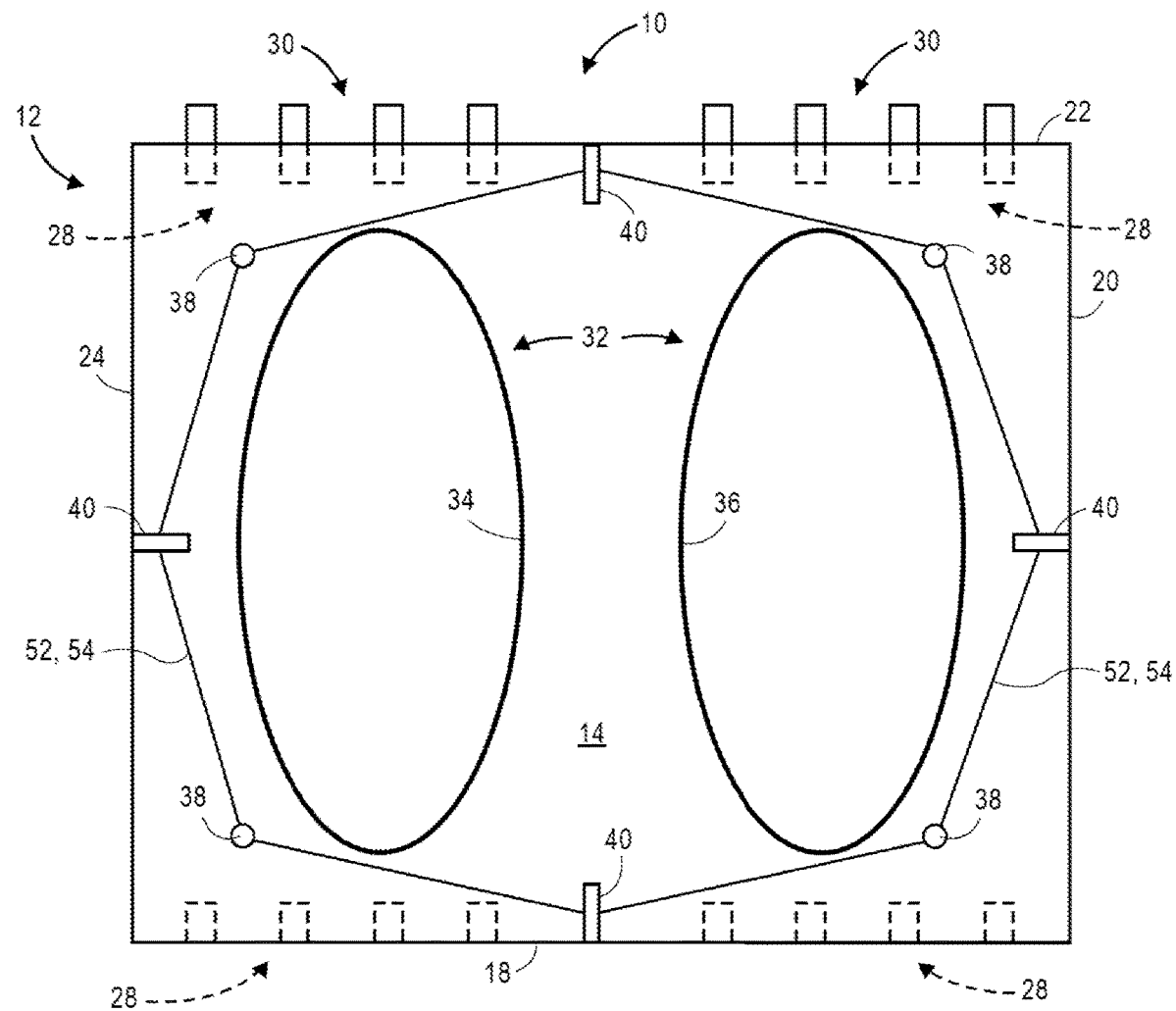
FIG. 1 is a top schematic view of a self-monitoring modular pavement slab according to embodiments of the present invention.

The drawing figures do not limit the current invention to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Prior art precast slabs have long been recognized as an alternative to continuous pour solutions, which have been more popular traditionally within the United States. Part of the appeal offered by precast paving systems is serviceability—when a portion of pavement requires service, it may be removed and replaced with relative ease as compared with similar repair efforts using continuous pour solutions aimed at restoring the pavement to like-new condition. Nonetheless, defects within the body of a pavement slab and/or in the underlying sub-grade may exist for years prior to detection, which may lead to additional damage and more expensive repair efforts.

Embodiments of the present inventive concept improve existing detection methods and apparatus by providing a permanent, embedded form-monitoring system comprising a plurality of strain gauges distributed in an array across at least a portion of the length and width of each precast slab. The array may be substantially continuous in nature—for example, where the array includes one or more fiber optic cables extending in a pattern throughout the slab—and may collect data at a plurality of strain detection points regarding the transfer of force through a sensing volume. The data collected from the strain detection points may be analyzed locally within each slab, using an adjacent system proximate to the slab, and/or transmitted to a remote database for analysis against data from neighboring slabs to detect developing defects in the sensing volume and/or underlying sub-grade. The data may also or alternatively be put to additional uses, including vehicle monitoring providing positional data, vehicle weights, speeds, axle widths, axle lengths, traffic patterns, vehicle behaviors, and other information that can be detected through monitoring the internal and external deformations of the pavement slab.

Collection of data regarding changes over time in how a segment and its surrounding segments within the sensing volume transfer forces therethrough may permit modeling of sufficient resolution to detect defects in the paving apparatus and/or in the underlying sub-grade. Moreover, accelerations, gyroscopic motion, magnetic fields, temperature, salinity, water content and additional properties may be detected within each slab to enhance data resolution and permit easier identification of changes in slab form and/or integrity and/or to monitor atmospheric or environmental conditions.

Figure 2:
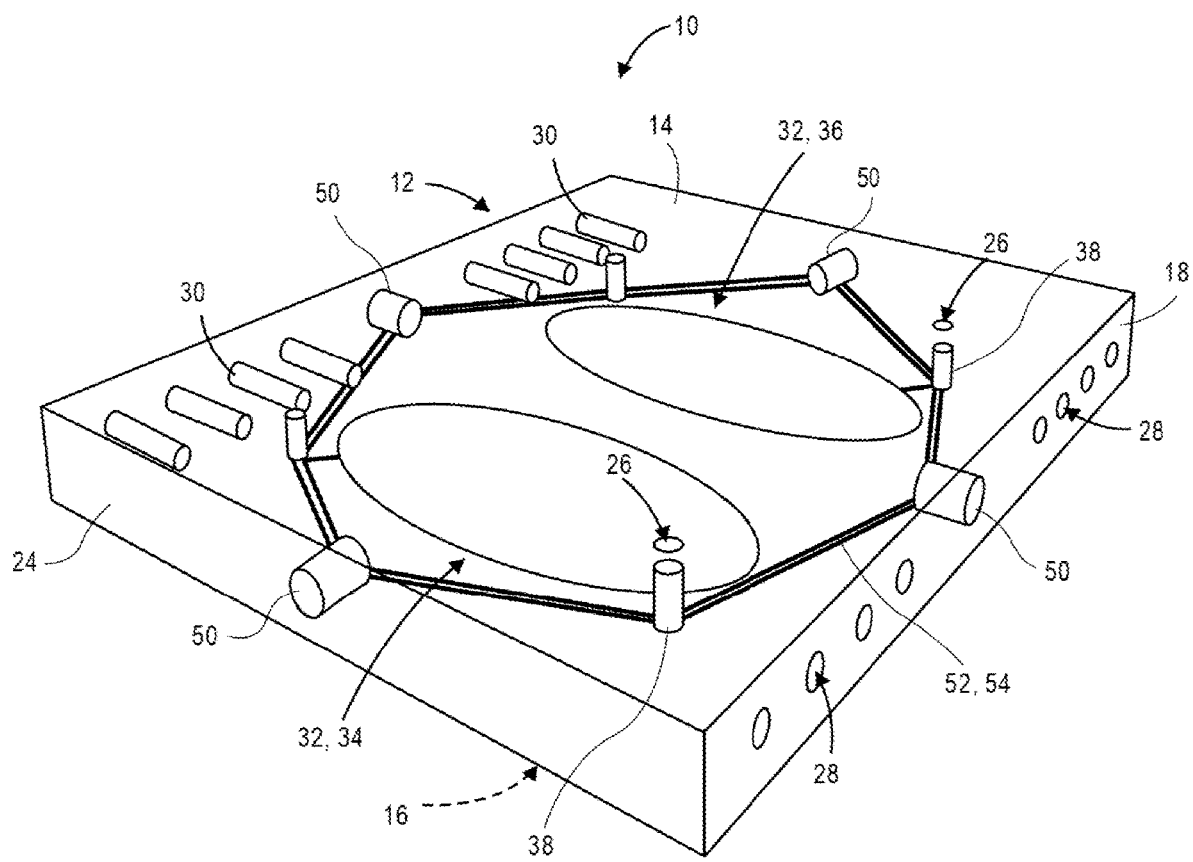
FIG. 2 is an elevated schematic view of the self-monitoring modular pavement slab of FIG. 1 illustrating a sensing body.

Turning to FIGS. 1-2, a precast, self-monitoring modular pavement slab 10 according to an embodiment of the present inventive concept broadly comprises a body 12 generally having a rectangular box shape with an upper surface 14, a bottom surface 16, and four side surfaces 18, 20, 22, 24. The body 12 may be composed primarily of precast concrete pavement. The body 12 may also or alternatively comprise asphalt, plastic material, fiberglass, carbon fiber, geopolymers and/or other materials that may serve as and/or support driving surfaces without departing from the spirit of the present inventive concept.

The modular pavement slab 10 may include a plurality of access ports 26 defined in and below the upper surface 14 (it should be noted that the third and fourth access ports are not illustrated in FIG. 2 to avoid obscuring other components). The access ports 26 may house embedded lifting receivers (not shown) and are spaced for balanced lifting of the body 12. Access ports may also permit fluid communication between upper and bottom surfaces and may be configured to house and/or provide access to other sensing equipment (see incorporations by reference below) without departing from the spirit of the present invention.

Two opposing side surfaces 18, 22 define load transfer device (e.g., dowel) cavities 28 therein that extend within and toward the center of the body 12. Load transfer devices such as connectors and/or dowel rods 30 may extend at least partway out of the cavities 28—for example where the modular pavement slab 10 is assembled to neighboring structures such as other paving apparatus—and each may be secured in place within the slab and/or a neighboring structure, following assembly, using grouting or the like.

It is foreseen that additional of the substantially vertical side surfaces or faces of a body may include load transfer cavities and devices without departing from the spirit of the present inventive concept. It is also foreseen that other load-transferring structure, such as tie bars, may be used in lieu of or in addition to dowel rods without departing from the spirit of the present inventive concept. Moreover, in embodiments of the present invention, the choice of load-transferring structure employed along a side of a slab may at least in part depend on the orientation of the side with respect to direction of travel of vehicles or other loads across the top of the slab. For example, in an embodiment discussed in more detail below, dowel rods may be employed along faces or sides of the slab that are transverse to the direction of travel (i.e., extending in the "x" direction of FIG. 4.), and tie bars may be employed along faces or sides of the slab that extend in the direction of travel (i.e., extending in the "y" direction of FIG. 4).

A rubber skirt, backer board, spacing rod, tar mixture, grouting or similar buffering substance may also be placed in seams between a modular pavement slab and neighboring structures and/or below the modular pavement slab. A modular pavement slab preferably also includes an internal reinforcement grid (see, e.g., FIG. 6A), which may be comprised of at least one layer of steel rebar lattice or other known internal reinforcement structures such as fiberglass reinforcement mat, geotechnical mat, carbon fiber mat, or loose reinforcement material such as fiberglass fibers, carbon fibers, plastic fibers, or metallic shavings. More broadly, it is foreseen that embodiments of the present inventive concept are interoperable with the paving systems and apparatuses described in U.S. Patent Publication No. 2016-0222594 A1 to Sylvester and in U.S. Patent Publication No. 2017-0191227 A1 to Sylvester, each of which is hereby incorporated by reference herein in its entirety.

The modular pavement slab 10 also includes a strain sensor array 32 distributed at least partly across the length and width of body 12. Strain sensor array 32 includes one or more optical fiber sensors. In the exemplary embodiments shown in the figures, the strain sensor array 32 includes first and second optical fiber sensors 34, 36. Each optical fiber sensor 34, 36 may include optical fiber sensing technologies including but not limited to one or more of Rayleigh, Brillouin, Raman, or Fiber Bragg Grating (FBG) technologies, distributed along the length thereof. In the described method using FBGs, the FBGs are positioned in the optical fiber with selectable space therebetween. Each FBG, or any other method implemented as described above but not limited to those specifically named, provides a measurement of the strain of its surrounding environment, which is a local volume, element or region of the body 12. Alternatively, or additionally, each optical fiber sensor 34, 36 may include a plurality of individually packaged FBGs coupled to one another with a plurality of optical fibers, with each optical fiber coupling two FBGs and providing a transmission and reflection path to and from each FBG and/or completing a loop from an emitter to a receiver with a single FBG between. It should be noted that emitters and receivers of optical fiber sensors may comprise a single device or multiple devices. Generally, each FBG reflects an optical signal, of a particular wavelength or small band of wavelengths, that it receives. The characteristics, such as intensity, amplitude, wavelength, and/or time delay, of the optical signal reflection may vary according to a strain, potentially among other factors, placed on the FBG.

The optical fiber sensors 34, 36 are shown in FIGS. 1-2 implemented with a circular or oval layout within the body 12. However, the optical fiber sensors 34, 36 may be implemented within the body 12 in a serpentine pattern layout, a coil pattern layout, a grid pattern, an array of individual fiber optic lines, or other geometric pattern layouts, including those depicted in FIG. 6 described in more detail below. In addition, the first optical fiber sensor 34 may have a first layout, while the second optical fiber sensor 36 may have a second layout. The optical fiber sensors 34, 36 are also shown to occupy separate regions of the body 12 in an XY plane. In other embodiments, the optical fiber sensors 34, 36 may overlap one another in the XY plane, or may otherwise occupy the same region of the body 12 within a given plane. While the drawings demonstrate two fibers, one or a plurality of additional fibers may be incorporated into the functional unit incorporating one or more fiber patterns, or fiber optic sensing methods, within the body of a slab.

The positioning of the FBGs or alternative sensing elements of other sensing methods within each optical fiber may be selected in combination with the layout of each optical fiber sensor 34, 36 to establish a desired resolution of the strain measurements throughout the volume of the body 12 (e.g., within the boundaries of the body 12 illustrated in FIG. 2) and/or with respect to the surface area of the upper surface 14 of the body 12. For example, a smaller spacing between FBGs within the optical fiber sensors 34, 36 produces a greater resolution of strain measurements, while a larger spacing leads to lower resolution. In addition, layout patterns of the optical fiber sensors 34, 36 such as a serpentine or coil produces a greater resolution of strain measurements, while patterns such as a circle provide lower resolution.

In an embodiment, a strain sensor array may include at least two optical fiber sensors (not shown) arranged in a linear layout and positioned within a slab along the length thereof. In such embodiments, optical fiber sensors in this embodiment may extend along a length of the slab positioned in proximity to, and association with, a wheel path of vehicles travelling on a corresponding apparatus. For example, a first and a second optical fiber sensor may be placed closer to outer edges of the slab along the wheel paths of most automobiles and trucks. A third optical fiber sensor may be placed close to the center of the slab along the wheel path of a motorcycle. It is foreseen, however, that in certain embodiments strain sensor arrays may include a plurality of strain sensors distributed across a portion of the length and width of the paving apparatus without departing from the spirit of the present inventive concept. One of ordinary skill will also appreciate that arrays including solid-state strain gauges, vibrating wire strain gauges, load cells, piezoelectric elements and/or similar known sensors are within the scope of the present invention.

While it is foreseen that embodiments of the present inventive concept may be constructed in the field or on site—for example as part of a cast-in-place installation—or be pre-fabricated into an assembly that can be installed into alternative paving materials such as asphalt or cast-in-place concrete, it is preferred that the strain sensor array 32 be encased and permanently fixed within body 12 during an offsite pre-fabrication process. The optical fiber sensors 34, 36 may be laminated and/or fixed to one or more sides of a reinforcement layer (not shown, but see, e.g., FIGS. 2-4 of U.S. Patent Publication No. 20170191227A1) of the modular pavement slab 10 during fabrication, essentially extending in a substantially horizontal (XY) plane at a given height within the body 12. More preferably, the optical fiber sensors 34, 36 may be laminated and/or fixed to a bottom side of a lower or bottommost reinforcement layer of the modular pavement slab 10. Placement near the bottom of the body 12 may provide greater resolution from and/or amplification of data collected by the strain sensor array 32. Moreover, fixing the strain sensor array 32 to a reinforcement layer may generate a more holistic data set representing changes in form across the entire body 12 because a preferred reinforcement layer will extend across substantially the entire length and width of the body 12 and may be less susceptible to localized distortions resulting from pockets or imperfections in the body 12.

It is foreseen that all or portions of a strain sensor array may be encased at different and/or varying heights within a slab without departing from the spirit of the present inventive concept. For instance, disposing at least one sensor at a different height within the slab—such as vertically above or below a second sensor—may provide additional resolution for detecting defects in the slab. However, long dimensions of optical fiber sensors are preferably in substantial alignment with a direction of travel, for example along a length axis, which may improve detection of vehicular load progression across a top surface of the slab. Dimensions of optical fiber sensors that are transverse or perpendicular to the direction of travel may improve detection of the lateral position of such a vehicular load on the slab. It is foreseen that a preferable arrangement of optical fiber sensors, each sensor having a region of the pavement surface that it can optimally sense, and each sensor having an orientation that improves detection of the longitudinal or lateral position of the vehicle load and position, will result in a sensor layout presenting a grid of sensors oriented in the traverse and longitudinal dimensions such that their sensing areas overlap each other in the x and y dimensions to ensure that a maximum area of the pavement can be sensed simultaneously by one or more sensors (e.g., oriented to the direction of travel and/or lateral position of the vehicle load on the slab).

Figure 3:
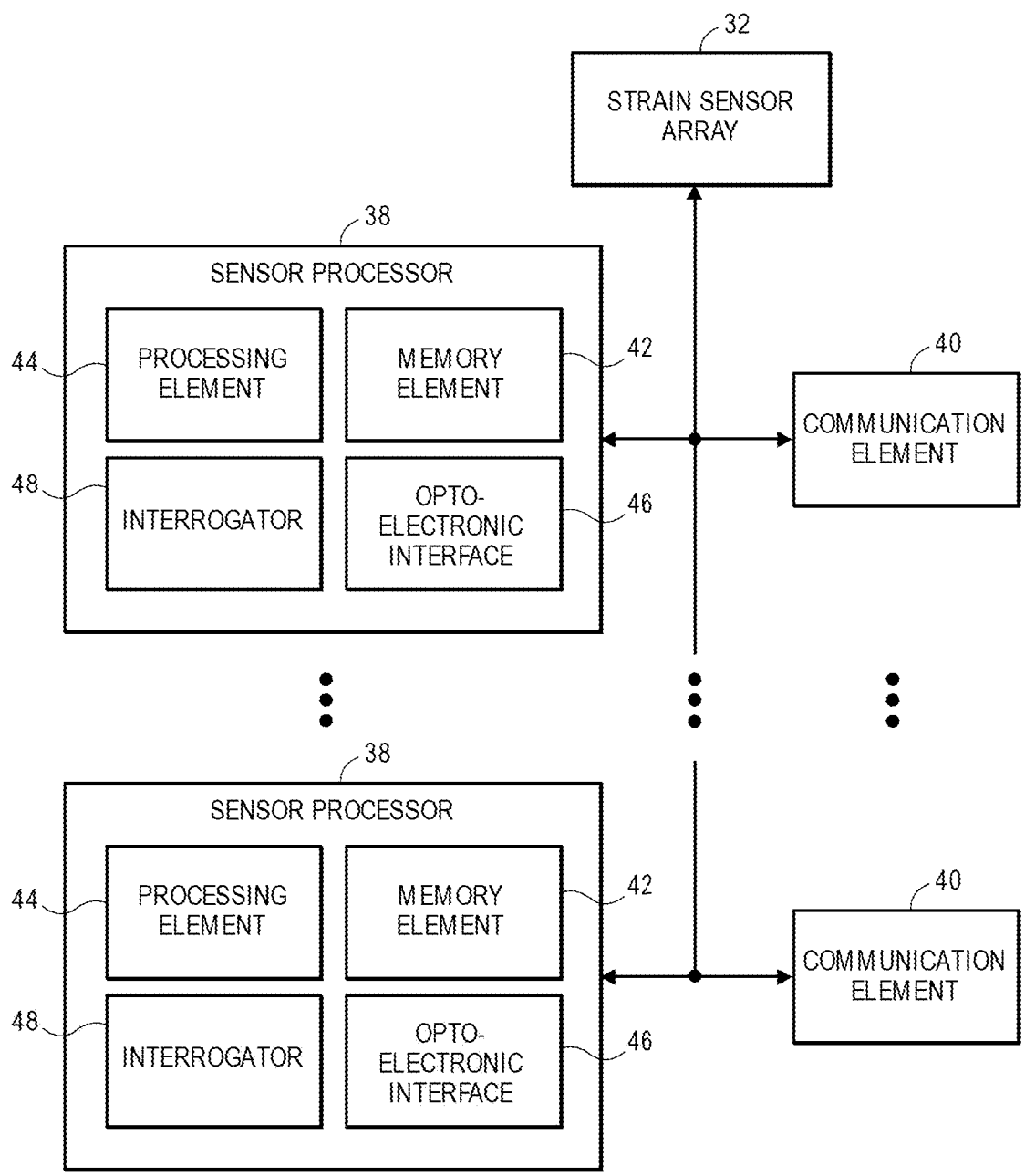
FIG. 3 is a schematic block diagram of various electronic components of the self-monitoring modular pavement slab of FIG. 1.

The modular pavement slab 10 also may include at least one sensor processor 38 and at least one communication element 40 to provide signal control and processing as well as communication, as shown in FIG. 3. The sensor processor 38 includes a memory element 42, a processing element 44, and an optoelectronic interface 46. Each sensor processor 38 may be retained within a housing that is accessible through a successive one of the access ports 26. In addition, each sensor processor 38 may be removable and replaceable, and access for such removal may be protected by a keyed security device—such as an interlock connecting the housing to the body 12 and requiring a special tool to disconnect—and/or grouting or the like. Alternatively the control system in FIG. 3 may lie in a separate enclosure outside the pavement slab (see discussion of FIGS. 4-9 below) whether through a direct connection or by making use of the edge connector as shown in FIGS. 10 through 13.

The memory element 42 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 42 may be embedded in, or packaged in the same package as, the processing element 44. The memory element 42 may include, or may constitute, a "computer-readable medium". The memory element 42 may store the instructions, code, code statements, code segments, software, firmware, programs, applications, apps, services, daemons, or the like that are executed by the processing element 44. The memory element 42 may also store settings, data, databases, and the like.

The processing element 44 may include electronic hardware components such as processors, microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 44 may generally execute, process, or run instructions, code, code segments, code statements, software, firmware, programs, applications, apps, processes, services, daemons, or the like. The processing element 44 may also include hardware components such as finite-state machines, sequential and combinational logic, and other electronic circuits that can perform the functions necessary for the operation of the current invention. The processing element 44 may be in communication with the other electronic components through serial or parallel links that include universal busses, address busses, data busses, control lines, and the like.

The optoelectronic interface 46 generally converts electronic signals to optical signals and vice versa. The optoelectronic interface 46 may include photonic generator(s), such as light-emitting diodes (LEDs), lasers including top emitters, edge emitters, or the like, as well as photodetectors, such as photodiodes, phototransistors, photoresistors, phototubes, or the like. The optoelectronic interface 46 may further include electronic circuitry such as amplifiers, filters, analog-to-digital converters (ADCs), digital-to-analog converters (DACs), and so forth. The optoelectronic interface 46 receives electronic signals and converts them to transmitted optical signals, i.e., electromagnetic radiation having a plurality of wavelengths in the visible and/or infrared regions of the electromagnetic spectrum. The optical signals correspond to the electronic signals in amplitude, frequency, and duration. The optoelectronic interface 46 receives optical signals and converts them to generated electronic signals having a voltage level, current level, power level, or the like corresponding to the optical signals in amplitude, frequency, and duration. The optoelectronic interface 46 may also generate an electronic data stream that corresponds to the received optical signals.

Through hardware, firmware, software, or various combinations thereof, the sensor processor 38 may be configured or programmed to perform at least the following functions. The sensor processor 38 generally controls the operation of the strain sensor array 32 by generating the input signals and communicating them to the strain sensor array 32 and receiving and processing the output signals of the strain sensor array 32. In some embodiments, a single sensor processor 38 may be coupled to and control the operation of both optical fiber sensors 34, 36. In other embodiments, the modular pavement slab 10 may include multiple sensor processors 38, each coupled to and controlling the operation of a respective one of the optical fiber sensors 34, 36. The sensor processor 38 further includes an interrogator 48 as a function of the processing element 44 or as a separate component. In some embodiments, the interrogator 48 may further include, or be in electronic communication with, the optoelectronic interface 46. Utilizing the interrogator 48, the sensor processor 38 generates a plurality of optical signals, each having a unique wavelength, which are transmitted through the optical fiber sensors 34, 36. The optical signals may be transmitted simultaneously or sequentially. The parameters of the optical signals transmitted by the sensor processor 38 may be selectively programmable.

In the illustrated embodiment, all of the optical signals are received by each FBG in the optical fiber sensors 34, 36. But, each FBG may reflect only the optical signal whose wavelength is the same as the one the FBG is designed to reflect. Furthermore, the characteristics of the reflected optical signal, such as intensity change, amplitude change, time delay, and/or shifted wavelength, may vary according to the strain experienced by the FBG, thus providing a measurement of the strain on the body 12 in the local volume surrounding the FBG. The sensor processor 38 receives all of the reflected optical signals and analyzes them to determine the strain at each location of an FBG. In addition, the sensor processor 38 repeats this process dozens or hundreds of times per second.

The sensor processor(s) 38 may create a virtual database or table of measured strain values that is stored in the memory element 42. The virtual database may include a plurality of historically-recorded strain values for each FBG. Since the X and Y coordinate locations (with respect to the upper surface 14 of the body 12) of each FBG are known, the sensor processor 38 may create a time-varying virtual map of strain values experienced by the body 12 resulting from the weight or mass of vehicles and other objects (such as pedestrians) travelling across the upper surface 14 thereof—each strain value indicating a strain experienced over time by a successive one of a plurality of regions of the body 12. In addition, utilizing the change in strain along a particular path or in certain areas, such as vehicle wheel paths, the sensor processor 38 can determine a velocity vector, i.e., a speed and direction, of the objects traversing the upper surface 14. Furthermore, the sensor processor 38 may utilize a lookup table or machine learning or artificial intelligence techniques to determine a type of vehicle that is traversing the upper surface 14 based on dynamic characteristics, such as a magnitude of change in amplitude, of the measured strain values.

The communication element 40 generally allows communication with external systems or devices. The communication element 40 may include signal and/or data transmitting and receiving circuits, such as antennas, amplifiers, filters, mixers, oscillators, digital signal processors (DSPs), and the like. The communication element 40 may establish communication wirelessly by utilizing radio frequency (RF) signals and/or data that comply with communication standards such as cellular 2G, 3G, 4G, LTE, or 5G, Institute of Electrical and Electronics Engineers (IEEE) 802.11 standard such as WiFi, IEEE 802.16 standard such as WiMAX, Bluetooth™, or combinations thereof. In addition, the communication element 40 may utilize communication standards such as ANT, ANT+, Bluetooth™ low energy (BLE), the industrial, scientific, and medical (ISM) band at 2.4 gigahertz (GHz), commercially available or customized Radio Frequency Identification (RFID), or the like. Alternatively, or in addition, the communication element 40 may establish communication through connectors or couplers that receive metal conductor wires or metal conductor cables which are compatible with networking technologies such as ethernet. In certain embodiments, the communication element 40 may also couple with optical fiber cables.

In some embodiments, the modular pavement slab 10 may include a single communication element 40 that is in electronic communication with the one or more sensor processors 38. In other embodiments, the modular pavement slab 10 may include a plurality of communication elements 40, each communication element 40 in electronic communication with a respective one of the sensor processors 38. In any case, the communication element 40 may receive measured strain values, velocity data, and vehicle data from one or more of the sensor processors 38 and communicate the data to other sensor processors 38 in the same modular pavement slab 10 or other slabs 10 or external devices or systems, such as through Bluetooth™, WiFi, and/or cellular protocols. The communication element 40 may also receive programming data or instructions for the sensor processors 38 to operate the strain sensor array 32 from external devices or systems or other apparatuses 10. The programming and instructions may be communicated to the appropriate sensor processors 38.

In various embodiments, the modular pavement slab 10 further includes a plurality of communication ports 50. Each communication port 50 may include a plurality of electrical and/or optical connectors. Each of the connectors, whether electrical or optical, may couple directly with a corresponding connector on the communication port 50 of another modular pavement slab 10 or with electrical cables or optical fibers that couple to other communication ports 50 and/or to remote embodiments of sensor processor 38. Each communication port 50 is positioned on a successive one of the four side surfaces 18, 20, 22, 24 of the body 12, typically close to the center of the side surface, such that, when the apparatuses 10 are placed next to one another to form a road, the communication port 50 of one modular pavement slab 10 aligns with, and may couple to, the communication port 50 of its adjacent modular pavement slab 10. In one or more embodiments, the communication port 50 may also or alternatively provide an interface providing connectors to link internal and external elements of optical fiber sensors 34, 36 and remote embodiments of sensor processor(s) 38. In addition, each communication port 50 is in electronic communication with one or more communication elements 40 to enable communication of measured strain values, velocity data, and vehicle data from one or more of the sensor processors 38.

Communication ports 50 may also be referred to as "edge connectors" (an exemplary embodiment of which is described in more detail below in connection with FIGS. 10-13). The ports 50 enable internal elements of the pavement (e.g., communication elements 40, optical fiber sensors 34, 36, sensor processors 38, or the like) to terminate along one or more edges of the slab. The ports 50 thus provide a connectorized interface for communication between elements 40 and/or processors 38 and other slabs 10 and/or communication network(s) (see FIG. 4). This may enable replacement of interconnect elements (e.g., at the interface) without modifying communicating electronic elements embedded more deeply or permanently within the slab 10. The ports 50 may permit each slab 10 to electronically communicate with external elements (e.g., with communication network 102 of FIG. 4) independently and/or via "daisy-chaining" among multiple slabs 10 arranged in sequence.

The modular pavement slab 10 also includes data and/or power lines 52, 54 extending between sensor processors 38 and communication elements 40. It is foreseen that the illustrated pattern of wired connection between electronics of the modular pavement slab 10 may vary, and/or that wireless communication routers may be used, without departing from the spirit of the present inventive concept. It is also foreseen that lines, cables and/or wires described herein for data and/or power transfer may comprise a variety of materials—including cable, fiber and wires of various materials—without departing from the spirit of the present inventive concept.

In operation, as a load is applied to upper surface 14, the applied force may propagate through segments of the sensing volume, creating temporary (and, possibly, permanent) deformations in the material of body 12. As the propagating force deforms areas surrounding the strain sensor array 32, strains are sensed by the optical fiber sensors 34, 36 and determined by one or more sensor processors 38. The time-varying measured strain data may be recorded and stored in one or more memory elements 42 and utilized to determine the presence and/or location of vehicles on the upper surface 14, as well as their orientations, directions, speeds, weights, tire pressures, and other data points which may be derived from such strain distributions.

Loads on the sensing volume of the body 12 may be continuously sensed over long periods of time, with significant strain response differences or localized variances in how forces move through segments of the sensing volume being noted as potentially indicative of defects in and/or damage to body 12 and/or the underlying sub-grade. Such data may be transmitted remotely for further processing against data gathered from surrounding slabs, or across time within any given slab, which may provide further clarity regarding the potential cause(s) of irregularity, such as by providing relative control groups of how nearby slabs are reacting to loads.

For example, taking certain aspects of one or more slabs as constant—such as installation on relatively consistently-graded surfaces, relatively consistent slab construction and dimensions, and relatively consistent traffic loads—data regarding differences in paving element response (e.g., differences in relative movement and load transfer through different elements of the slab(s)) can reveal problems with or changing conditions in sub-grade, damage to the body 12 or a portion thereof, changes in internal strain and/or transfer, and other problem areas requiring maintenance in the short- or long-term.

In an embodiment, paving element response in a first segment of the body 12, reflected in strain gauge sensing data from a first strain gauge of the array 32, may be determined over a first period of time and a second, subsequent, period of time. If variance between the paving element response between the first and second time periods is of one or more types and/or of a sufficient magnitude (e.g., strain in that segment is demonstrably increased in response to similar loads during the second time period as compared to the first), it may be determined that there is an increased: (A) risk of a structural defect in the pavement slab, and/or (B) risk of a problem with underlying sub-grade beneath the pavement slab. The one or more types of variance referenced above could include, for example, differences in paving element response between a time when a vehicle initially exerts its weight on the corresponding segment of the body 12 and a subsequent time when the vehicle has moved further along the body 12, with a significant, unexpected or drastic change in strain gauge measurement across the times being potentially indicative of one or both of the risks outlined above.

Further, in an embodiment, paving element response in a second segment of the body 12, reflected in strain gauge sensing data from a second strain gauge of the array 32, may be determined during the first or second time periods. The paving element response in the second segment over one of the periods of time and in response to similar loads as those borne by the first segment over the same period(s) of time may be compared with the corresponding paving element response in the first segment. If variance between the paving element response in the first and second segments is of one or more types and/or of a sufficient magnitude (e.g., strain in the first segment is demonstrably greater in response to substantially the same loads during the same timeframes), it may be determined that there is an increased: (A) risk of a structural defect in the pavement slab, and/or (B) risk of a problem with underlying sub-grade beneath the pavement slab.

Still further, it should be noted that the analysis described in the preceding paragraph may be conducted where the first and second segments are in different pavement slabs connected directly or indirectly by load-transferring connectors (e.g., in adjacent slabs attached by dowel rods and/or tie bars).

Alternatively or in addition, one or more of the factors held constant in the example of the preceding sentence may instead be allowed to vary, with the values for each such variable preferably being known and/or corrected for with data gathered by one or more of the sensors 34, 36. For example, data from the one or more sensors 34, 36 may indicate a vehicle departure immediately prior to reaching a first paving element, and the corresponding first paving element response may be interpreted relative to a second paving element response in view of that departure (i.e., by adjusting the analysis to take into account the fact that the vehicle departed the slab(s) at some point between the second and first paving elements).

Sensor data may also or alternatively be analyzed locally and/or remotely in real time for use by navigation (e.g., autonomous) guidance systems, emergency alert and car deviation systems, and for other uses. Data obtained from the strain sensor array 32 may also be used to measure internal and applied loads, deflection, 3D shape, moisture content and/or temperature. The data may be analyzed to indicate vehicle location, orientation, speed, weight, and the like.

For instance, the communication elements 40 may establish direct and/or indirect communication(s) with vehicles for transmitting raw and/or processed data collected via the strain sensor array 32. Such data may be used in connection with autonomous and/or self-driving technologies (e.g., Level 4 autonomous driving). In an embodiment, one or more of the communication elements 40 may continuously or periodically transmit such data—i.e., regarding objects and/or vehicles present on the slab 10 (e.g., position, velocity, weight, etc.)—to one or more autonomous vehicles to support automated navigation. In a more particular embodiment, data obtained via the strain sensor arrays 32 of a system of slabs 10 may comprise and/or be integrated into vehicular location, positioning, navigation, telemetry, or obstacle avoidance systems to provide and/or improve accuracy of positional data in support of autonomous driving operations.

In addition, the communication elements 40 may receive data and/or information from vehicles implementing autonomous and/or self-driving technologies that are in the vicinity of, or traveling upon, the corresponding slab 10. The data and/or information may include velocity and/or heading information, vehicle identification information, and the like. The data and/or information may be utilized by the slab 10 for verification purposes, fault detection or correction purposes, and the like. Additionally, or alternatively, the data and/or information may be transferred to other slabs 10 in the vicinity or in the direction of travel of the vehicle.

It should also be noted that a benefit of the illustrated embodiment, while not required to practice the present inventive concept, is multiple redundancies. For instance, first and second optical fiber sensors 34, 36 may permit operation, albeit with potentially reduced data resolution, even in the event one fails. Moreover, the multiple sensor processors 38 may redundantly include interrogators 48 and/or electrical communication with the optical fiber sensors 34, 36 such that failure of a single sensor processor 38 does not necessarily lead to loss of any output from the strain sensor array 32. In the same vein, multiple communication elements 40 may also provide several data outputs (and, preferably, inputs) that may increase the longevity of each modular pavement slab 10 by providing alternative access points in the event of a single communication element 40 failure.

System and Methods

Figure 4:
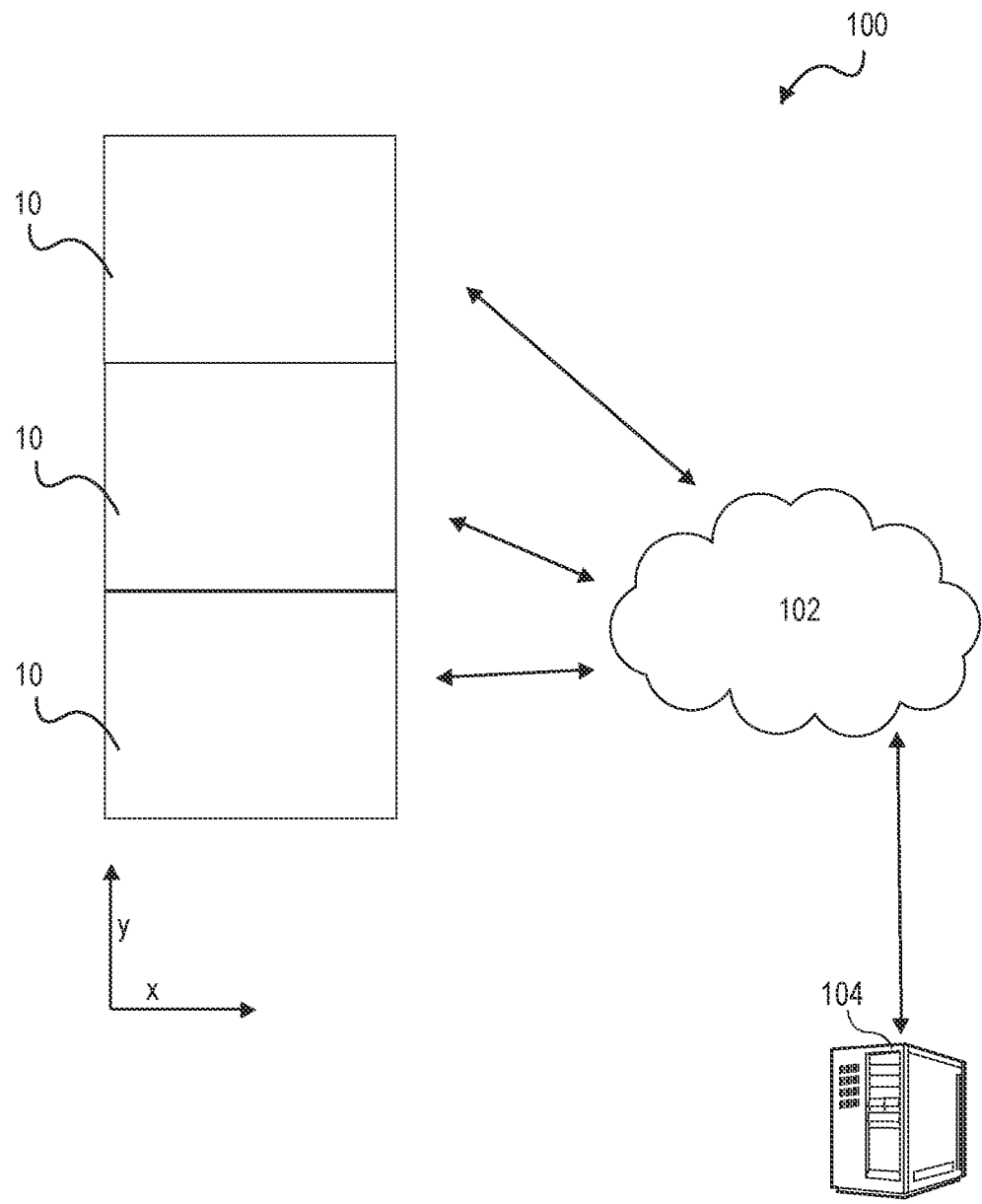
FIG. 4 illustrates various components, in block schematic form, of an exemplary self-monitoring modular pavement slab system in accordance with embodiments of the present invention.
Figure 5:
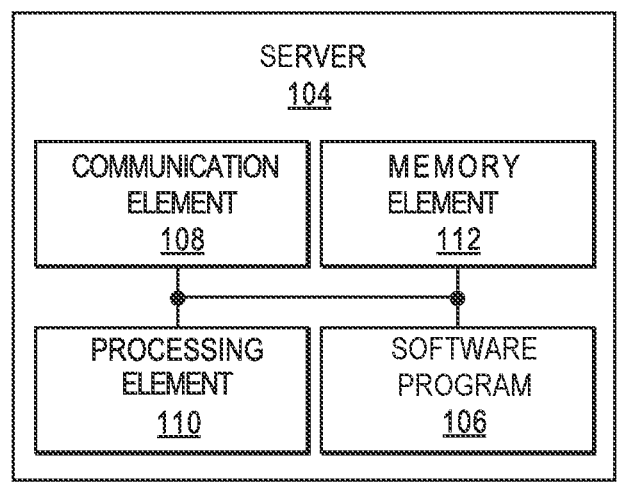
FIG. 5 illustrates various components of an exemplary server shown in block schematic form that may be used with the system of FIG. 4.

Turning now to FIGS. 4-5, an exemplary system 100 for utilizing slabs 10 is illustrated. The slabs 10 may be constructed substantially as described above and/or may be replaced with alternative embodiments such as those described in more detail below in connection with FIGS. 6-9. For instance, in one or more embodiments of the slab of FIGS. 6-9, signal processing, receivers, emitters and the opto-electronic interface may be housed with or adjacent to the server 104 (discussed below) instead of within the slab, and such components are in electronic communication with sensor grids in the slab via fiber optic cables. Digital to analog conversion, raw data processing, derivation and refinement may also occur at the server 104 instead of within the slab.

The system 100 includes a plurality of slabs 10 aligned in a longitudinal or "y" direction corresponding to a direction of travel of vehicles or other masses across top surfaces of the slabs 10. In an embodiment, load transferring connectors comprising dowel rods (not shown) join the slabs 10 to one another along sides extending perpendicular to the direction of travel (i.e., in the "x" direction). One of ordinary skill will appreciate that additional columns of slabs 10 (not shown) may be similarly constructed and arrayed on one or both sides of the illustrated column of slabs 10 in the "x" direction. Slabs 10 adjacent one another in the "x" direction may be joined using tie bars (not shown) or other load transferring connectors.

A communication network 102 may provide electronic communication between the slabs 10 and/or between the slabs 10 and a server 104. Moreover, the communication network 102 may provide electronic communication between the slab(s) 10 and/or server 104 and external computing systems. The external computing systems (not shown) may be controlled by third parties such as private or government actors desirous of receiving data, alerts and/or reports generated by the server 104 and described elsewhere herein. In an embodiment, communication elements of the slabs 10 comprise a portion of the communication network 102 and/or implement electronic communication between the slabs 10 and/or between the slabs 10 and the communication network 102.

The communication network 102 may include local area networks, metro area networks, wide area networks, cloud networks, the Internet, cellular networks, plain old telephone service (POTS) networks, and the like, or combinations thereof. The communication network 102 may be wired, wireless, or combinations thereof and may include components such as modems, gateways, switches, routers, hubs, access points, repeaters, towers, and the like. For example, the slabs 10 and/or the server 104 may generally connect to the communication network 102 using wired connections and/or wirelessly, such as by radio frequency (RF) communication using wireless standards such as cellular 2G, 3G, 4G, or 5G, Institute of Electrical and Electronics Engineers (IEEE) 802.11 standards such as WiFi, IEEE 802.16 standards such as WiMAX, Bluetooth®, or combinations thereof. In one or more embodiments, the communication network 102 is at least partly a wired network comprising fiber optic cables.

The server 104 generally retains electronic data and may respond to requests to retrieve data as well as to store data and/or perform computations. The server 104 may be embodied by one or more application servers, database servers, file servers, gaming servers, mail servers, print servers, web servers, or the like, or combinations thereof. Furthermore, the server 104 may include a plurality of servers (e.g., rack servers), virtual servers, or combinations thereof. The server 104 may be configured to include or execute software such as file storage applications, database applications, email or messaging applications, web server applications, or the like, in addition to and/or in conjunction with a software program 106. (See FIG. 5)

In an embodiment, the server 104 may include or comprise a front-access and/or standalone server, a network interface, and various databases including raw data and spatial mapping databases (not shown). The server 104 may comprise and/or be in electronic communication with an interrogator for electronic communication with fiber optic sensors and/or the communication network 102. Other conventional features, such as firewalls, load balancers, application servers, failover servers, site management tools, and so forth may also be utilized in conjunction with the server 104 but are not shown. The server 104 may apply methods or algorithms, may utilize lookup tables or databases, receive user input via one or more peripheral devices or associated systems, or perform tasks in connection with the steps outlined herein.

The server 104 may include a communication element 108, processing element 110, and memory element 112.

The communication element 108 generally allows communication with external systems or devices. The communication element 108 may include signal or data transmitting and receiving circuits, such as antennas, amplifiers, filters, mixers, oscillators, digital signal processors (DSPs), and the like. The communication element 108 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth™, or combinations thereof. Alternatively, or in addition, the communication element 108 may establish communication through connectors or couplers that receive metal conductor wires or cables which are compatible with networking technologies such as ethernet. The communication element 108 may also couple with optical fiber cables, e.g., via an interrogator. The communication element 108 may be in communication with or electronically coupled to memory element 112 and/or processing element 110.

Preferably the devices of the system 100 communicate via secure and/or encrypted communication means. For example, all or some of the server 104 and slabs 10 may securely exchange transmissions using DES, 3DES, AES-128 or AES-256 encryption and/or RSA (748/1024/2048 bit) or ECDSA (256/384 bit) authentication. It is foreseen that any means for secure exchange may be utilized without departing from the spirit of the present invention.

The memory element 112 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 112 may include, or may constitute, a "computer-readable medium." The memory element 112 may store the instructions, code, code segments, software, firmware, programs, applications, apps, services, daemons, or the like that are executed by the processing element 110. The memory element 112 may also store settings, data, documents, sound files, photographs, movies, images, databases, and the like.

The processing element 110 may include processors, microprocessors, microcontrollers, DSPs, field-programmable gate arrays (FPGAs), analog and/or digital application-specific integrated circuits (ASICs), or the like, or combinations thereof. The processing element 110 may include digital processing unit(s). The processing element 110 may generally execute, process, or run instructions, code, code segments, software, firmware, programs, applications, apps, processes, services, daemons, or the like. The processing element 110 may also include hardware components, such as finite-state machines, sequential and combinational logic, and other electronic circuits that may perform the functions necessary for the operation of embodiments of the present invention. The processing element 110 may be in communication with the other electronic components through serial or parallel links that include address busses, data busses, control lines, and the like.

Methods

Described below are steps of exemplary computer-implemented methods for utilizing the system components of embodiments of the present invention. Some steps may be performed concurrently as opposed to sequentially, and may in some cases be performed in a different order. In addition, some steps may be optional. The computer-implemented methods may be executed by exemplary devices and components introduced with the embodiments illustrated in FIGS. 1-14 in any combination. For example, the steps of the computer-implemented methods may be performed by slabs 10 and/or slabs 200 described in connection with FIGS. 6-9 below (with or without communication ports 50 which may comprise and/or be replaced with one or more edge connectors 226 described in connection with FIGS. 10-13 below) through the utilization of processors, transceivers, hardware, software (such as the software application 106), firmware, or combinations thereof. However, a person having ordinary skill will appreciate that responsibility for all or some of such actions may be distributed differently among such devices or other computing devices without departing from the spirit of the present invention. For example, steps described in connection with the computer-implemented methods outlined below may be performed by the processing element 110 alone or in combination with processing element(s) 44, and software program 106 may be executed by any combination of the foregoing and/or other computing devices. One or more computer-readable medium(s) may also be provided. The computer-readable medium(s) may include one or more executable programs, such as the software program 106, stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

In an embodiment, the software program 106 includes one or more algorithm(s) trained (e.g., via machine learning techniques) or otherwise configured to perform computations, calculations, identification operations, classification operations and similar computations on sensor data input, as outlined in more detail below. In one or more embodiments, analysis of the sensor data may be according to one or more other algorithms or rules configured to perform one or more classification operations. For example, the algorithms and/or rules may optionally be implemented in conjunction with and/or through execution of a machine learning program. The machine learning program may include curve fitting, regression model builders, convolutional or deep learning neural networks, Bayesian machine learning techniques, or the like. The machine learning program may identify patterns in data sets to help generate the one or more classifications. The machine learning program may be trained using supervised and/or unsupervised machine learning processes without departing from the spirit of the present invention.

It should also be noted that sensor data generation, and corresponding computations, calculations, identification operations, classification operations and similar computations on the sensor data input may be performed automatically and/or with manual input, and resulting alerts and other transmissions (e.g., to third party computing systems) may likewise be triggered automatically and/or manually within the scope of the present invention.

Slabs according to embodiments of the present invention may include fiber optic sensor arrays (such as arrays 32 and/or FOSS loops 215, 216 shown in FIGS. 6-9) that provide for the sensing of continuous strain values across a range of outputs. Combination of multiple sensors on an array in a single paving slab (or "unit"), with each sensor reading a continuous value across a range, permits integration of data across multiple sensors, as well as multiple paving units. By integrating multiple continuous values in a single paving unit or across multiple paving units, a system including those units may provide high strain-resolution readings for each sensor, high time-resolution for each strain reading, and high spatial resolution for the collected strain and time readings. The combination of such features turns an individual paving unit, or multiple joined paving units, into a system that may perform analogously to a touch-screen on a mobile device, though of course the paving units in question take readings sensing tire or other load positions rather than finger positions.

Preferred paving units generate multi-axial high-resolution output across strain, time, and space, and the output data can be integrated and analyzed to produce significant derivative readings that may not be obtained from the implementation of a single sensor, an array of sensors in a single unit, or an array of units with singular or multiple sensors. These derivative readings may require significant and complicated software analytics to implement in a reliable fashion across multiple sensors and multiple units, including but not limited to wherever the derivation comprises an accurate, precise, transient, localized strain reading from a raw data signal that includes multiple complicating factors such as transient thermal noise, vibrations from adjacent but indirect vehicle, equipment, or pedestrian presences, and the internal strain environment of a relaxed system with no external strain source present.

Embodiments of the present invention may implement complex processing algorithms to reduce, clean, and order datasets generated by sensing elements of the paving units and/or to remove undesirable signal components. Such error-corrected structured strain data can be compared between multiple time and space readings from multiple sensors to identify congruencies between the individual readings against a variable spatial offset, time offset, or strain value offset. The spatial offset can be relative or absolute, abstract or specific depending on the desired application. The time offset can be relative or absolute, abstract or specific as well, but presumably the time offset will be identified using standard time measuring methods, such as universal time coordinates, "Unix time," synchronization with a time server, global positioning system (GPS), or some other accurate, available, and accepted method for measuring time.

It should also be noted that much of the description herein focuses on a load applied by a vehicle overlying slab(s) of embodiments of the present invention. One of ordinary skill will appreciate, however, that vehicles are utilized herein as an example for ease of reference. It is foreseen that other dynamic (e.g., moving) objects and loads may be measured in addition to or in place of vehicles without departing from the spirit of the present invention. For example, speed, dimensional, weight distribution and other classification operations described below in connection with vehicles may be performed with minimal modification in connection with classification of pedestrians or other animals (e.g., where each foot or the like takes the place of vehicle tire).

Vehicle Dimensions, Motion, and Identification

An exemplary grid of sensors may be embedded in a paving unit or group of paving units, wherein the direction of load (e.g., vehicle) travel over the unit(s) is along a Y-axis, a lateral pavement direction is along an X-axis, and a time dimension is signified by a T-axis. Comparison of cleansed, structured strain data from multiple of the sensors that are aligned along the X-axis can register the presence of a tire, then compare the signal or data to other of the sensors with an offset (difference, differential, change, etc.) in the X, Y, or T dimension. Through the comparison of these readings from multiple offset sensors, the individual sensation of a singular tire can be correlated with confidence to one or more other signal(s) or data set(s) respectively corresponding to one or more other loads (e.g., one or more other tire(s)) across the respective dimensions. This method enables, for example, the derivation of not just a single tire sensation, but of a grouping consisting of two or more tires conjoined across an axle, with the axle representing a fixed spatial offset in the X-dimension.

By further analyzing the T-dimension in connection with, for example, axle detection, the sensor grid can identify the direction of travel of the axle and of the vehicle to which it is attached. This direction of travel derivation can be calculated, e.g., by a server of embodiments of the present invention, and utilized in a number of applications, such as where a signaling system uses the derivation to generate an alert when a vehicle is traveling in the wrong direction, for example when a vehicle enters roadway, highway, interstate, or other type of roadway traveling in the wrong lane. Further, such a signaling system may pass on alerts to any parties that may need or wish to receive said alert, including an owner of the vehicle or asset such as a municipality or DOT, respective management facilities and personnel such as a Traffic Management Center, Traffic Operations Center, Traffic Systems Management and Operation, or emergency services such as police, highway patrol, state troopers, or other persons who may wish to respond to intercede with respect to the vehicle traveling in the wrong direction.

By analyzing the T-dimension of data gathered from a singular axle passing over multiple sensors oriented along the X-axis, and comparing it T-offset from its original detection to the detection by a second set of sensors oriented with a Y-offset, a time delta can be used to derive an estimated vehicle speed. Once the initial time delta is derived for vehicle speed, the aforementioned set of sensors oriented along the X-axis may register detection of the vehicle's second axle using the same method as for the first axle to derive the axle width of the second axle. Comparing the second axle detection to the vehicle's speed allows derivation of the distance between n and n+1 axle positions of the vehicle. This provides a track length between adjacent axles of a vehicle. In summary, analysis of X, Y, and T dimensions of sensor detection may provide the first axle width, the vehicle speed, the second axle width, and the track length(s) of the vehicle.

Based at least in part on the original axle X-axis offset of the first axle, the second axle X-axis offset of the second axle, and the track width, the fiber optic sensor array (and/or a server or other processing element in communication therewith) may derive presumptive dimensions of the vehicle (e.g., with some margin of error). These dimensions may be used to categorize the vehicle into one or more vehicle categories and/or subcategories, for example as defined by existing industry and regulatory vehicle categorization methods.

Through integration of external data sources such as tables containing the dimensions of multiple vehicle makes and/or models, dimensions derived from the sensor system and methods outlined herein may be used to assign a probability that a detected vehicle is a specific make and model of vehicle, and may estimate a production year range. As some combinations of make, model and production year range may respectively include vehicle types having different track widths and track lengths—for example long-bed, extended-cab, or dually trucks—make and model detection according to embodiments of the present invention may extended to identify specific trim levels and options packages.

Weigh-in-Motion (WIM)

Recalling the discussion above regarding continuous reading of strain values across a range of outputs, it should also be noted that a system according to embodiments of the present invention may incorporate one or more algorithms trained (e.g., using machine learning) or otherwise configured based on known values (e.g., weights) for vehicles. Such algorithm(s) may be configured to correlate specific strain value(s) from one or more sensor(s) to a weight or imposed mass, with a high degree of precision and accuracy. Such algorithm(s) may form the foundation for improved WIM systems of embodiments of the present invention.

Most existing WIM systems consist of a strain gauge comprising a single strip laid into a groove or cut in pavement. As a single strip, such existing systems rely on the accuracy of a singular weighing event as each axle passes over the strip. In comparison, embodiments of the present invention utilize at least one embedded array of sensors. The array(s) provide the opportunity to weigh vehicles repeatedly and continuously as they move across the grid formed by the array(s). By repeating the weighing process multiple times as the vehicle moves across a single slab and/or across multiple slabs, the system according to embodiments of the present invention may remove outlying readings (e.g., that deviate from a pre-determined range), for example where readings above and/or below a range are removed or screened from further calculations and/or consideration.

It should be noted that sensed loads may vary as a vehicle or other load travels across pavement. For example, a vehicle may bounce on its suspension as it travels from one point to another. This can result in an erroneously low reading if an existing sensor takes readings as the vehicle is elevated on its suspension, or an erroneously high reading if an existing sensor takes readings as the vehicle's mass rebounds into the suspension. These errors are inherent in the conservation of momentum and the vehicle's inertia across a rough surface as its suspension moves. With a single pass of readings from a traditional WIM system, it can be difficult or impossible to remove momentous or inertial errors imposed by vehicle's vertical motion, or errors imposed by braking or accelerating across the sensor.

In comparison, embodiments of the present invention may read strain values across a grid multiple times or continuously across a single pavement slab or across multiple slabs joined by load transfer devices or connectors. An algorithm trained (e.g., via machine learning) or otherwise configured to perform calculations on raw sensor data received from the grid may correct for, filter and/or sort out any extraneous readings imposed, for example, by such momentous or inertial errors imposed by vehicle's vertical motion, or errors imposed by braking or accelerating. Such error correction may comprise or be assisted through the use of such grid(s) of sensors because such error-inducing motion of the vehicle may be transient and/or may lead to readings which essentially cancel each other out due to the conservation of momentum (e.g., if an algorithm utilizing averages or the like is used to interpret sensor data). Thus, in embodiments of the present invention such erroneous values may be observed as outliers and discarded, or integrated across a mean, median, or mode functionality to improve the accuracy of the reading.

Sensor grids according to embodiments of the present invention may comprise multiple sensors within a single, continuous, unit or cable. Further, one or more sensor grids—capable of correcting for measurement error(s) described above—may further be embedded within a single slab. Readings taken from the single slab may further reduce such error(s) because the multiple distributed readings may nonetheless be taken as a vehicle travels across the single slab because it is less likely to encounter an obstacle (such as a junction between slabs) which might cause bounce, braking or other such sources of measurement error. Thus, the readings for a sensor array embedded in a single paving unit may provide a fundamentally more accurate reading by eliminating extraneous signal components.

Other advantages of embodiments of the present invention relate to minimizing damage to embedded sensor array(s) from outside causes. An existing WIM system sensor is placed within a groove or cut in pavement, and is subject to debris intrusion that can damage or disrupt the sensor's operation. Further, under certain conditions, an existing WIM sensor can delaminate from the groove or cut and be pulled out. Still further, pavement maintenance crews may be assigned to use tar or other joint sealant materials to fill cracks in the pavement, and will inadvertently destroy an existing WIM sensor by filling the groove or cut in which it resides. In contrast, the sensor grid(s) of preferred embodiments of the present invention are embedded in the body of pavement slab(s), and are accordingly defended from debris intrusion, delamination, or application of joint sealant.

Other advantages of embodiments of the present invention are also apparent from comparison to existing WIM systems. For example, an exemplary existing WIM system comprising a weigh station may be placed along a long-haul span of interstate. Being knowledgeable of the most likely location of such weigh stations, commercial vehicles may move illegal loads (e.g., those in excess of maximum regulated weight) short distances within a city, whether on a street or interstate, so as to avoid weight stations intended to prevent such behaviors. In a more particular example, garbage trucks may move garbage comprising overweight loads from facilities within a city to a dump outside the city along routes that lack weight stations. This behavior accelerates deterioration of roadways, interstates, bridges, and so forth, but existing systems and methods do not have sufficient capability to detect and control these behaviors.

In contrast, embodiments of the present invention include precast pavement slabs with embedded sensor arrays that may be utilized along a greater variety of roadways and for a wider array of applications, making it exceedingly difficult for excessive or otherwise unlawful loads to go undetected. Moreover, algorithms of embodiments of the present invention may arbitrarily manage such sensor array(s) or grid(s) to improve the control of heavy traffic, and in doing so reduce deterioration of roadways and the corresponding maintenance costs for fixing damage. Also, embodiments of the present invention may be configured to utilize raw data from the embedded sensor grids for a wide variety of purposes, including WIM applications.

Another example that illustrates advantages of systems according to embodiments of the present invention relates to operational variances of vehicles. That is, a vehicle may have varying operational weights corresponding to changes in operational status, such as the presence or absence of passengers or fuel, and/or the presence or absence of oil, brake fluid, washer fluid, or any of the other myriad fluids that may or may not be within or carried by the vehicle. Existing WIM systems do not account for such variances (e.g., due to oil, brake, or washer fluid fill levels), though the vehicle weight will vary significantly based thereon (e.g., variances such as the level of its fuel tank, and the weight of individual passengers within the vehicle).

In contrast, systems according to embodiments of the present invention offer grid(s) of sensor arrays distributed across a slab and/or across multiple slabs joined with load transferring devices or connectors. Resultant weight readings are comparatively continuous, reading weight substantially as a continuous value along all or a portion of such arrays. Moreover, embodiments of the present invention include algorithms trained (e.g., via machine learning) or otherwise configured to correlate sensor data and readings corresponding to a single vehicle across time and space. Thus, embodiments of the present invention are configured to calculate, detect and/or identify variation in vehicle weight not only attributable to unwanted bouncing or braking or the like (discussed above), but also attributable to the consumption of fuel or other fluids within the vehicle, addition or loss of a passenger from the vehicle, or to other such variances in operational status. For example, the algorithm may be trained or otherwise configured to interpret the sensor array data corresponding to a single data to adjust for a steady decline in weight attributable to fuel consumption. Moreover, these calculations may take into account expected fuel consumption retrieved from data tables once make, model and/or other attributes of the vehicle are identified within acceptable error. Likewise, the algorithm may be trained or otherwise configured to identify other recognizable weight changes, for example resulting from refueling actions and/or receipt or emission of passengers, materials, or any other objects that may be loaded into or out of the vehicle.

Moreover, returning briefly to discussion above on the generation of alerts based on sensor data by systems according to embodiments of the present invention, it should be noted that such WIM systems may be configured to provide vehicle weight information to entities such as the TMC, TOC, TSMO, police, or other emergency services as part of weigh-station requirements and implementation of maximum weight regulations imposed by states and cities to manage commercial traffic loads on their roadways and direct those loads to vehicles designed to handle said loads.

Weight Distribution and Management

A vehicle's weight is distributed in some manner across the tires it rests on, and summing the weight across those tires generally provides the total weight of the static vehicle. Sensor grids of systems according to embodiments of the present invention may weigh each tire of a vehicle continuously, and may calculate the weight of the vehicle by summing the weight imposed by all of the tires.

Nonetheless, the continuous weight sensing of sensor grids of embodiments of the present invention may permit sensing of the individual weight loads applied by each tire of a vehicle. Thus, embodiments of the present invention provide the opportunity to register not only a vehicle's weight, but also its weight distribution.

Supplementing the discussion above regarding classification and categorization of vehicles based on dimensions, algorithms according to embodiments of the present invention may be trained (e.g., via machine learning) and/or otherwise configured to consider a vehicle's weight distribution sensed by the sensor grid(s) of one or more slabs during classification and categorization to improve accuracy. For example, front-wheel-drive front-engine vehicles tend to have a different weight distribution than rear-wheel-drive front-engine vehicles. This difference is also observed with rear-wheel-drive mid-engine vehicles, rear-wheel-drive rear-engine vehicles, all-wheel-drive front engine vehicles, and any other combination that may be present. In addition, when a truck has a load in its rear, the overall weight of the vehicle changes, as does the weight distribution across each axle and tire. Sensor grids within a pavement unit or slab, or across multiple units or slabs joined with load transferring devices or connectors, provide continuous load sensing enabling algorithms of embodiments of the present invention to use such sensor data in the form of weight distribution input to improve vehicle classification.

In an embodiment, recognition of weight distribution may help in classification of loaded vehicles of many types, including but not limited to commercial transportation loads, the loading of persons into transit vehicles, and the weight distribution of a trailer load. With respect to trailer load more specifically, it is well known that loading a trailer towards its back end creates an unsafe handling condition, and that a trailer is safer when loaded towards the tongue or evenly across the axle. Improved sensor grids outlined herein in connection with embodiments of the present invention may generate sensor data permitting determination of such unsafe weight distribution and loading conditions and, in turn, may generate alerts or the like for distribution to entities such as TMC, TOC, TSMO, police, and other emergency services.

Demographic Profiles

In embodiments of the present invention, one or more of the computations and classification operations described above and elsewhere herein—performed based at least in part on sensor data from one or more sensor grids distributed across a single precast slab and/or across multiple precast slabs joined by load transfer devices or connectors—may have generated derived or refined data reflecting a vehicle's dimension(s), weight(s), and weight distribution(s). As noted above, analog to digital conversion and interpretation of the sensor data and performance of such computation and classification operations may occur at any combination of sensor processor(s) embedded in the slab(s), the server(s) in electronic communication with the slab(s) and/or other computing devices in communication with the slab(s) and/or the server(s). Moreover, computation and classification operations (e.g., for determining make, model, trim level, and production year range of sensed vehicle(s)) may rely at least in part on accessing one or more database(s) storing standardized vehicle characteristics (e.g., vehicle dimensions, weight distribution etc.) for training classification algorithm(s) and/or comparison against corresponding sensor data and derived data relating to sensed vehicles.

Moreover, such derived data (and, possibly, raw data) may be transmitted to and/or stored by a computer system including a server in electronic communication with the slab(s) (e.g., server 104). The computer system may also generate alerts configured as transmissions to one or more external computer systems controlled by third parties, as outlined elsewhere herein.

Additional data may be received and/or stored by the computer system and/or database(s) accessed in connection with performing computation and/or classification operations in connection with sensed vehicles or other objects. For example, the additional data may be used to improve the accuracy and utility of embodiments of the present invention. For example, the computer system may periodically or continuously receive registration records from one or more departments of motor vehicles (DMVs) including data relating vehicle owner(s) to owned vehicles. The registration records may include data relating to one or more of: vehicle makes, models, production years, and trim levels. The registration records may also include demographic data relating to one or more characteristics of the owner(s), such as: height, weight, familial relations, age, residence or the like. Linking owned vehicle data to owner demographic data may provide, for example, additional variables and/or latent variables for use as input to trained classification algorithm(s) and/or additional points for comparison against sensed data and/or sensed data patterns to assist in other classification operations, as discussed in more detail below.

In one or more embodiments of the present invention, demographic data collection may be enhanced by integrating data from multiple DMV registration sources, for example across multiple states. Also or alternatively, a computer system according to embodiments of the present invention may limit training datasets for supervised machine learning of a classification algorithm by geographic location. For example, the computer system may segment available DMV data for use in training a classification algorithm according to distance from a sensed object. As the demographics of vehicle ownership can change across regions, cities, states, nations, and other geographic areas due to a multitude of factors, geofencing DMV record comparisons or training data sets for make and model ownership can further improve the accuracy of classification operations for demographic detection based on identifying the type of vehicle.

In an embodiment, the system may train multiple instances of a classification algorithm (or multiple classification algorithms) for use in different geographic regions. More particularly, a classification algorithm may be "assigned" or used in classification operations for sensor data generated by slabs within a particular geographic region, and DMV records including vehicles registered to addresses within the particular geographic region may be more heavily weighted or exclusively used for training that classification algorithm. This may improve classification accuracy wherever localized behaviors, vehicle design or modification (e.g., customization within particular regions), individual behaviors (e.g., carpooling is prevalent or not) or other vehicle or demographic variances may impact classification operations.

Dimensionality reduction and other techniques may be used to identify the most meaningful vehicle and demographic data available in DMV records for input to classification algorithms assigned to regions of different sizes. Optimal region size(s) (e.g., hexagonally shaped regions covering one hundred (100) square miles) and data set variables or elements may be identified. Moreover, one of ordinary skill will recognize that optimal region shape(s) may be determined, taking into account, for example, the varying shapes of population centers and demographic heterogeneities across regions.

One of ordinary skill will also appreciate that such regions may overlap, resulting in multiple classification outputs for a single vehicle being generated by multiple corresponding classification algorithms covering different but overlapping geographic regions. In such scenarios, the computer system may utilize overarching logic to combine or select the best from among the multiple classification outputs (e.g., using decision tree(s) for resolving the best of the available classification outputs).

DMV records and corresponding demographic profiles may be integrated or combined with additional data sources to support such classification operations. For example, databases of computer systems of embodiments of the present invention may store all or part of census records reflecting additional useful data about potential vehicle owners, such as income level, education level, marriage status, family size, and so on. Additionally or alternatively, databases of computer systems of embodiments of the present invention may store all or part of data sets available from social media sources providing other data about potential vehicle owners, such as likely interests, audiences, behavioral patterns, and other look-alike style profiles.

As noted above, all or some of the additional information gathered from external sources (e.g., DMV records, census records, social media data, etc.) may be utilized to improve the accuracy of classification algorithms. For another example, once traffic records have been developed and detailed with such metadata sources providing probable demographic information, census information, interests, behaviors, and other look-alike details, the data can then be used for various types of analysis, such as regression analysis to control for independent and dependent variables. This may allow the reversion of the analytical outcomes to extrapolate demographic and other details from traffic information, regress to a given variable, and then application of the traffic insights to that variable. In this way, the traffic data collected in one location can be used to generate look-alike audiences for other geographic areas, municipalities, states, roads, or some other geospatial variable, and extrapolate the traffic readings from one location into individual or multiple correlating factors for another area. In this method, the combination of traffic data with various other data sources can then be transferred to different areas by controlling the intermediating variables in order to derive insights into areas that are similar to the area that is collecting traffic data, without having to directly collect traffic data in those look-alike areas. For example, if some pattern of traffic behavior is detected by embodiments of the present invention in a first area, and a strong demographic correlation can be generated to one or more other areas, then the traffic behavior from the first area can be extrapolated to infer traffic behavior in the other areas with high confidence.

It is foreseen that such vehicle and demographic data available from DMV records, census records, social media sources and other external sources may be otherwise utilized to identify demographic variables reflecting characteristics or behaviors that improve vehicle classification without departing from the spirit of the present invention. For example, untrained classification algorithms and/or classification algorithms relying on unsupervised learning may be configured at least in part based on such vehicle and demographic data within the scope of the present invention.

Roadway, Lane, and Vehicle Geocoordinate Positioning

Preferably, sensor grids according to embodiments of the present invention are configured for optimal accuracy enabling, for example, geospatial reasoning supporting the uses outlined elsewhere herein and others. Preferably, each sensor in the grid is associated with geocoordinate(s) that identify, to a high degree of precision and accuracy, the specific position of the sensor in terms of latitude and longitude and/or alternative geo-positioning coordinate systems. In this manner, sensor analysis methods disclosed herein may rely upon highly accurate positioning system(s) that identify exactly where each sensing event is taking place.

Further, according to typical road construction and mapping techniques, roads may be delineated according to right-of-way, easements, and other exterior boundaries registered, for example, with various Recorders of Deeds, plat maps, surveyors' maps, and according to multiple other methods that identify relative and absolute positions and contours of roadways. Overlaid on these exterior boundaries are interior divisions of the roadway for lanes, e.g., as delineated by markings upon the road, and typically recorded by builders in "as-built" files preserved by owners of roadways and referenced by surveyors when performing road work.

Turning back to embodiments of the present invention, combining high precision and accurate geo-positioning of each sensor of sensor grids embedded in a single slab and/or across multiple slabs joined by load transfer devices or connectors with roadway boundaries and road markings outlined above and delineating lanes for a road system, data processing and storage assets for embodiments of the present sensor system may identify the relative position and path of each lane of each roadway relative to the sensor grid(s).

Such mapping may enable generation of highly accurate, persistent local road maps with lane demarcations which support computations and calculations according to embodiments of the present invention including, for example, automated classification of vehicles, vehicle behaviors, and traffic patterns and behaviors and automated mapping of the vehicles and metadata to individual lane(s) equipped with sensor grids of embodiments of the present system. For example, in one or more embodiments, assignment of geo-coordinates to sensor grids may enable the roadway and road lanes to be overlaid in a digital mapping space. The computer system of embodiments of the present invention may also use sensor data from the sensor grid(s) to identify vehicle dimensions and positions and may attribute such vehicle dimensions and positions to the exact lane and road position on a combined digital map.

In this way, sensor grid(s) according to embodiments of the present invention may automatically identify the position of sensed vehicles on the combined digital map, and place the vehicles' exact location, orientation, direction of travel, speed, and dimensions on the digital map, at least in part relying on the high precision and accuracy geocoordinates corresponding to the sensors detecting the vehicle within the lane. Methods according to embodiments of the present invention may be applied simultaneously to all vehicles present upon a section of a road through use of sensor grids, which may be accurately placed on the digital map across all lanes, and such aspects of the vehicles may be updated continuously across time with high precision and accuracy positional data updated at a high time and space resolution as the vehicles move.

Collision Detection & Safety Hazards

Tracking vehicles using sensor grid(s) embedded in and distributed across a single slab and/or multiple slabs joined by load transfer devices or connectors according to embodiments of the present invention may enable development of additional valuable insights. For example, vehicle movement and projected movement over a roadway may be compared against a variety of outside data points, for example indicating relative position with respect to instructional signage or other vehicles (e.g., emergency vehicles or other passenger vehicles). The comparison may yield output useful for traffic control systems, emergency response or other applications. Because the dimensions and positions of the vehicles may be identified continuously or substantially continuously according to embodiments of the present invention, the underlying sensor grid(s) and algorithms for classification and computation outlined herein may identify time(s), timeframe(s) and/or position(s) along a road when and/or where vehicles intersected and/or their paths are projected to intersect. In an embodiment, a likely collision is classified wherever tracked vehicles and/or their paths intersect or are closely adjacent for a moment or period of time, followed by a change in trajectory and separation of the vehicles' positions. Whenever embodiments of the present invention detect and determine the likelihood of such an occurrence, corresponding automated alert(s) may be generated and transmitted to interested authorities (e.g., emergency services) as outlined elsewhere herein.

Such collision detection capabilities of embodiments of the present invention may also enable storage of details of vehicle behavior immediately prior to and immediately following an event classified as a likely collision, and may automatically collect and store other available data that may be related to the likely collision, such as traffic signal status of proximate signals, and position(s), driver behavior(s) and speed(s) of other proximate vehicles.

In one or more embodiments, one or more algorithms (e.g., forming part of and/or in cooperation with a database management system) include instructions for automatically flagging likely collision classifications output based on sensor data collected by sensor grid(s) embedded in and distributed across a single slab and/or multiple slabs joined by load transfer devices or connectors. The algorithm(s) may automatically access a profile corresponding to the flagged likely collision classification. The profile may be customized based on geographic location, sensed characteristics of the vehicles involved in the collision, sensed characteristics of driver behavior of the vehicles involved in or adjacent to the collision, and other data points relevant to identifying which local variables are worthy of being recorded to later reconstruct the causes for a collision. For example, erratic sensed passenger vehicle behavior leading to a collision, alone or combined with determination that the likely collision occurred late at night, may be linked to a suspected intoxicated driver profile that instructs, among other things, collection of the involved vehicle's position data for an extended period of time prior to the collision. For another example, a daytime collision involving a freight truck may be matched to a profile customized for collecting and storing data relating to the movements of other vehicles on the roadway before and after the suspected collision occurred. One of ordinary skill will appreciate that multiple profiles may be combined wherever the matching conditions underlying their structure are present.

The profile may be matched to the flagged collision classification using available sensed data provided by the computer system. As noted above, the profile may contain instructions regarding what other relevant data to collect and store in the system's databases, including by identifying data objects in the system and timeframe of collection. The computer system of embodiments of the present invention may generally preserve raw sensor data and/or derived data for a limited period of time to conserve storage space. Storage duration may vary across data types and/or objects. The computer system may automatically (periodically or continuously) parse the aforementioned data storage profiles to identify storage requirements defined therein that exceed current storage duration settings, and may adjust the storage settings to ensure compliance with the most excessive of the profiles' storage requirements (generally and/or with respect to each data type and/or object).

As noted above, such datasets preserved in connection with suspected collisions may provide valuable information for collision reconstruction, and may be used to assign blame for collisions in connection with police or insurance investigations and/or in litigation settings.

Also as noted above, the computer system according to embodiments of the present invention may be configured to extrapolate vehicle paths or positions based on recent past sensed vehicle position(s). for example, the system may identify the position of vehicles at a high time resolution, and be programmed to extrapolate that position across presumptive curves based on potential curves derived from local roadway geometry, immediate trajectory history, and/or other vehicles' past, current, and/or presumptive trajectories. In this way, the system may identify the likelihood of a possible accident before it happens, whether by identifying the possibility for a collision between vehicles (e.g., where two vehicles are approaching an intersection on trajectories that indicate they will collide) and/or by determining that a vehicle may be at risk of other unsafe behavior (e.g., where the vehicle has crossed lane boundaries repeatedly and is now approaching another vehicle that is immediately adjacent to a lane boundary). Embodiments of the present invention may also determine that a vehicle has left the roadway, or may be in danger of leaving the roadway. For example, the computer system may output a likely road departure emergency based on a combination of variables relating to sensed vehicle behavior and stored roadway data regarding the characteristics of the roadway over which it travels. In a more particular example, a classification algorithm of the computer system may receive as input data indicating that the roadway in question is a mountain pass with a history of run-off-the-road accidents, as well as vehicle position data indicating a vehicle was detected moving at a high rate of speed immediately before its trajectory crossed a boundary of the edge of the road and the vehicle was not further detected. Based on such input, the algorithm may output a classification corresponding to a likely road departure emergency and the computer system may access a corresponding data preservation profile, collect and store potentially relevant according to the profile, and/or generate alert(s) to emergency service(s) or the like.

Built Environment Insights

Using geopositional data generated by the sensor grids of embodiments of the present invention, along with road boundary and lane marking data, vehicle and traffic data may be digitally overlaid on other maps representing businesses, residences, industry, and other real estate developments adjacent to such roads. Such maps may also be populated with adjacent ingress and egress points for parking lots or other roadways. Utilizing the maps and sensed vehicle data, calculations of flow rates and vehicle counts may be made for timeframes prior to and following vehicle passage through ingress and egress points to calculate the flow of vehicles into parking lots and/or turning onto new road sections.

Such calculations may be in addition to, or in replacement of, alternative vehicle count and flow rate measurements that are typically used by public agencies, real estate developers, property managers, and other stakeholders that have an interest in understanding traffic data for surrounding areas.

Sensor grids and slabs according to embodiments of the present invention may also inform usage of unimproved stretches of roadway. For example, sensor grids in paving units at ingress lanes to an intersection may generate data permitting generation of extrapolated values for flow of traffic through each lane and into egress lanes of the intersection. Such extrapolated values may support generation of high-quality estimates of the traffic flows on sections of roadways that are not improved with sensor grids of embodiments of the present invention. Accordingly, the count and flow of vehicles turning or going straight at each section of roadway may be expanded beyond individual areas covered by sensor grids of embodiments of the present invention with a high degree of accuracy, e.g., up to the point that there is an additional unmonitored ingress or egress point. In one or more embodiments, improvement of alternating (monitored) intersections with sensor grids may produce high-quality interpolations of the traffic flows at unmonitored intersections in between the monitored intersections.

More generally, utilizing all or some of the methods outlined herein, sensor data and derivative or refined data and values, derivative traffic values, make and model classifications, demographic profiles, probabilistic audience models, and the like may be collected and/or generated. As noted immediately above, embodiments of the present invention may also be configured to generate significant and valuable analytics based on traffic movements as they relate to the built environment. For example, owners of a restaurant may have an interest in how many vehicles pass by its location near a mealtime, where count is limited to vehicles with owners matching a specified demographic profile (i.e., a preferred audience). Such property stakeholders may use the data outlined above in order to make improvements to the operation of their business. For another example, municipal authorities may use the data outlined above to better understand traffic behaviors, how changes to lanes or signals affect dynamic variables such as vehicle speeds, acceleration or deceleration rates, collision risks, and so on. For still another example, real estate developers may use such data to optimize selection of properties for development, or to optimize selection of types of development to better match the derived demographics of the pre-existing traffic with their preferred audiences for the real estate development.

Pavement and Subgrade Condition Indexing

Sensor grids according to embodiments of the present invention may also provide additional insights beyond traffic data. As discussed previously, sensor data streams from the grids may require significant computation to derive traffic data elements from the data streams. Complicating factors of such analyses include internal strain profile(s) of the pavement and transient thermal noise. An internal strain profile describes the distribution of strain inside the solid body of the pavement slab or unit at rest. This data point provides valuable insights into pavement condition.

A baseline strain profile may be generated by, for example, reading a strain profile from a sensor of a sensor grid at rest following initial installation of a pavement slab or unit in which the sensor is encased, and removing any traffic signals or thermal noise. Following this initial state, the pavement slab or unit will deteriorate across its operational life, in response to vehicle loads, environmental changes, subgrade changes, and other events or conditions that temporarily or permanently alter the pavement.

Once the baseline strain profile is established, additional readings can be taken at intervals in a manner that allows regression of variables to isolate the pavement condition and identify changes over time. For example, recording relaxed strain profiles at a pre-determined interval, and normalizing the profile data for environmental changes (temperature, precipitation, atmospheric pressure, etc.) may permit generation of a graph of internal strain profile over time. The pavement condition can be estimated and indexed by interpreting the changes in the strain on such graph(s).

In an embodiment, a first portion of pavement may comprise one or more slab(s) stretching across a first longitudinal location of a road. A second portion of pavement may comprise one or more slab(s) stretching across a second longitudinal location of the road adjacent the first longitudinal location. The first portion of pavement may include one or more sensor grid(s) according to embodiments of the present invention, and the second portion of pavement may not. However, because vehicles typically travel in a direction of travel (e.g., longitudinally) across slabs or units of pavement and only depart or enter the pavement at egress points and ingress points, it may reasonably be extrapolated that pavement slab(s) at the second longitudinal position adjacent to slab(s) at the first longitudinal position will receive the same or similar traffic loading. As such, as long as the composition and initial condition of the second portion of pavement are comparable to the first portion of pavement, the pavement condition for the second portion of pavement may be derived with a high level of accuracy from a pavement condition index created from the sensor grid readings of the strain profile changes over time for the first portion of pavement.

In a similar manner to the pavement condition index outlined above, other insights may be derived to index subgrade condition according to embodiments of the present invention. For example, before any vehicle is present on a sensor grid of such a slab, the slab is at rest, and has a baseline rest profile for strain distribution. When a vehicle first imposes its weight on the slab, the slab has a loading response. The vehicle travels across the slab, creating strain readings. The vehicle then leaves the slab, creating an unloading response. By reading the slab's loading and unloading responses when the slab is new, a subgrade condition baseline can be established. By then taking subsequent readings of the loading and unloading responses at intervals, and controlling for variables, changes over time of the pavement loading and unloading responses may be graphed.

The loading and unloading responses of the slab may be compound measurements that result from combination of the slab's baseline condition, the vehicle dynamics creating the load(s), and the subgrade condition(s). Using techniques already described, vehicle dynamics and pavement condition may be controlled for. Subgrade condition may be the remaining prominent factor in the slab's response to loading and unloading. Through generating a graph of pavement hysteresis in response to loading and unloading while controlling for vehicle dynamics and pavement condition, the pavement hysteresis can be interpreted to derive the slab's subgrade condition. In this manner, systems of sensors according to embodiments of the present invention may support generation of subgrade condition indexing functions. In a similar manner to pavement condition indices, subgrade condition indices generated for a first segment of pavement including sensor grid(s) according to embodiments of the present invention may be extrapolated for use with adjacent segment(s) of pavement that do not include such grid(s), preferably wherever the composition and initial condition of the adjacent segments are comparable.

Other Exemplary Embodiments of Slabs

Turning now to FIGS. 6-9, another exemplary embodiment of a self-monitoring modular pavement slab 200 is illustrated. Preferred spatial aspects and dimensions shown therein are merely exemplary and not intended to be limiting. The slab includes dowel pockets 202, 204 along opposite faces 206, 208 extending transversely to a direction of travel of vehicles and/or other loads. Load transfer devices or connectors comprising dowels extend between and are received within respective paired male 202 and female 204 dowel pockets of adjacent slabs (upon assembly). Top and bottom reinforcement mats 205 (e.g., comprising grids of intersecting epoxy coated rebar) are embedded within the body of the slab 200 and illustrated in FIG. 6A. It is foreseen that embodiments of the present inventive concept illustrated in FIGS. 6-9 are interoperable with and/or may comprise or be assembled in accordance with the paving systems, apparatuses and methods described in U.S. Pat. No. 9,920,490 to Sylvester, filed May 16, 2016, and entitled MODULAR PAVEMENT SYSTEM (the "'490 patent"), which is hereby incorporated by reference herein in its entirety.

It should be noted that opposite faces 210, 212 of the exemplary slab that extend parallel to the direction of travel are joined to adjacent slabs for load transfer utilizing tie bars 213 and pockets 214 rather than dowels and corresponding pockets 202, 204. However, it is foreseen that these load transferring connectors may be employed along different faces and in different patterns without departing from the spirit of the present invention.

Sensor elements of the slab 200 include Type 1 Fiber Optic Sensing System (FOSS) interface cables extending in two loops 215, 216 longitudinally in the direction of travel (i.e., in the "y" direction). The loops 215, 216 are spaced across the width (i.e., the "x" direction) of the slab based on average axle track of vehicles. Alternatively formulated, the loops are spaced so as to be positioned directly below or as close as possible to the wheels of as many vehicles as possible.

Figure 6:
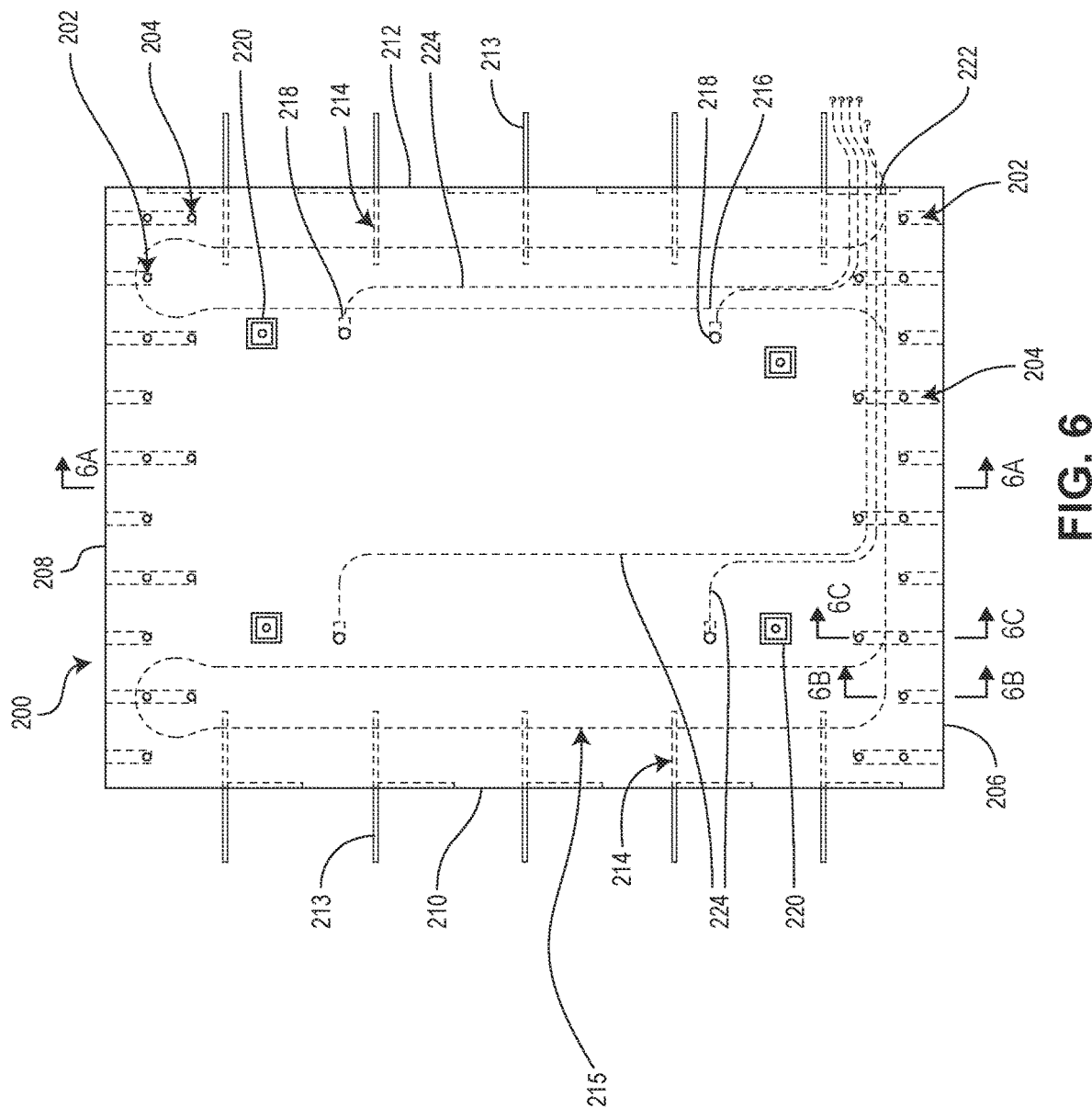
FIG. 6 is a top view of a self-monitoring modular pavement slab according to embodiments of the present invention.
Figure 6A:
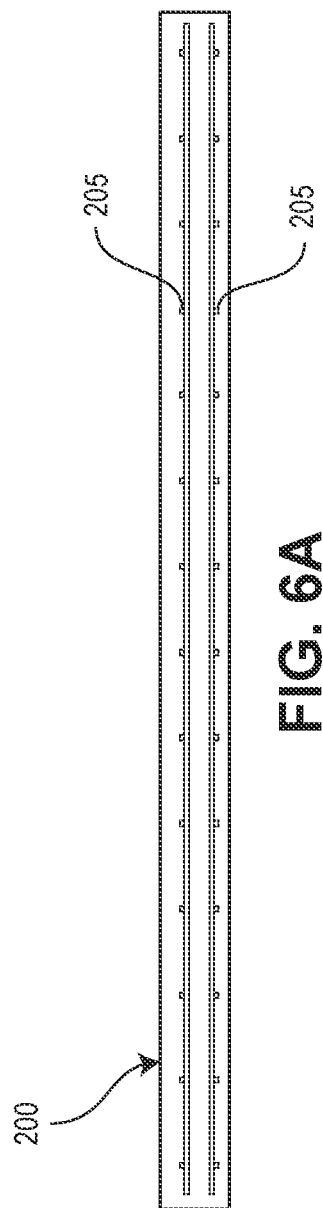
FIG. 6A is a cross-sectional side view taken along line 6A-6A of FIG. 6 and showing top and bottom reinforcement mats.
Figure 6B:
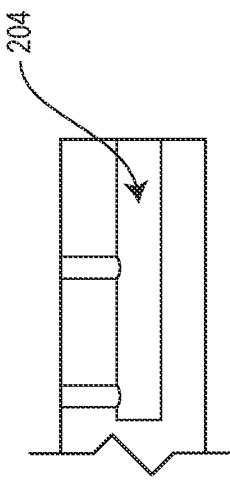
FIG. 6B is a cross-sectional side view taken along line 6B-6B of FIG. 6 and showing a female connector pocket.
Figure 6C:
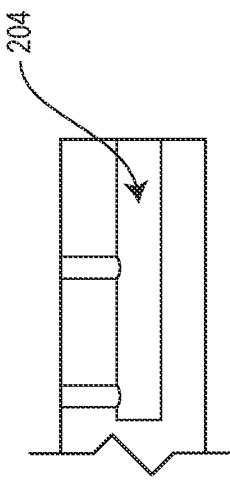
FIG. 6C is a cross-sectional side view taken along line 6C-6C of FIG. 6 and showing a male connector pocket.
Figure 10:
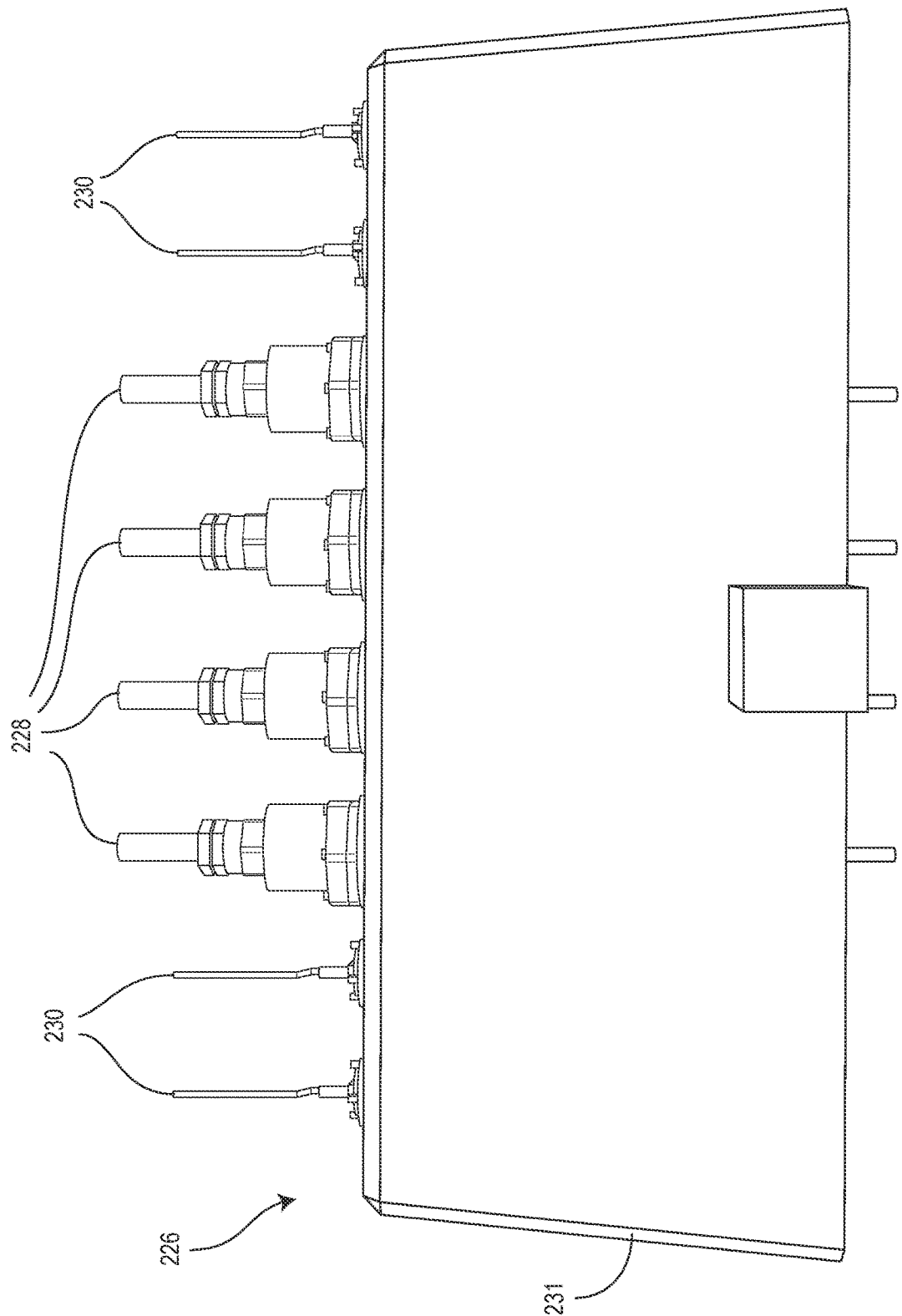
FIG. 10 is a top view of an edge connector of a self-monitoring modular pavement slab according to embodiments of the present invention.
Figure 11:
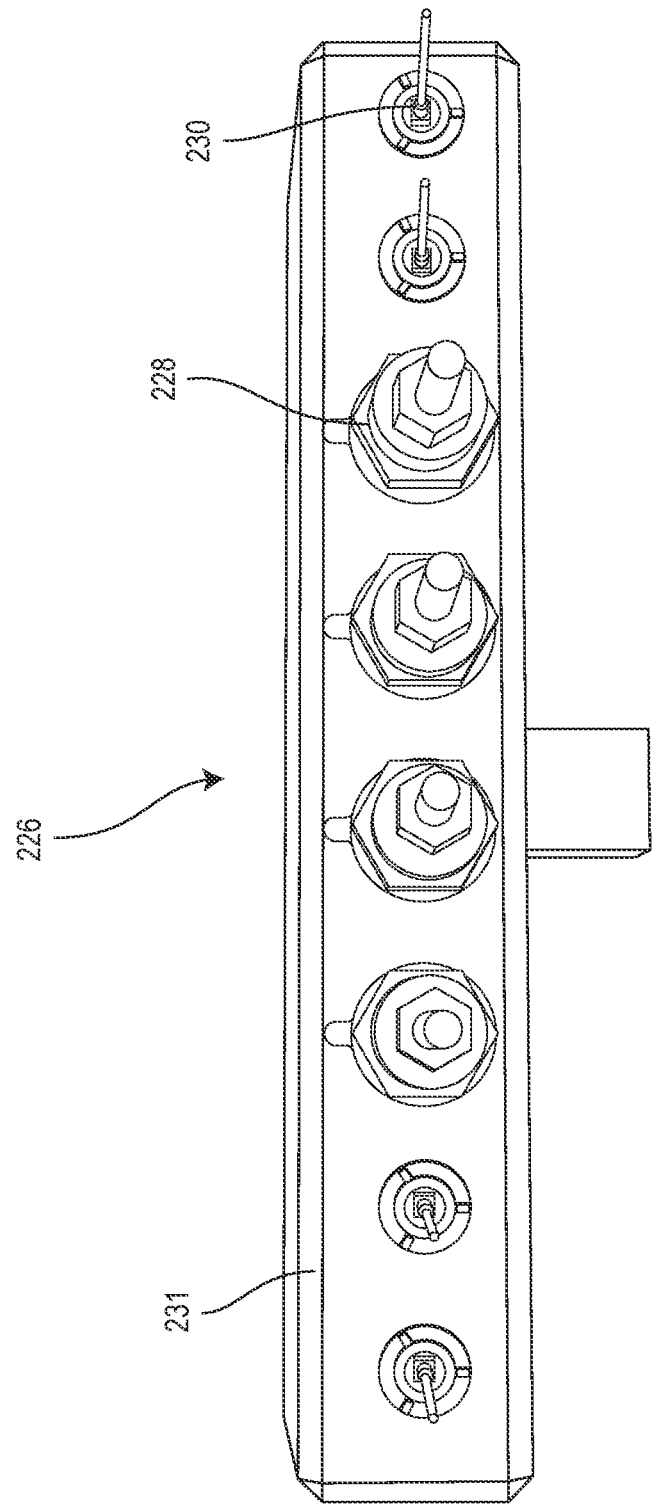
FIG. 11 is a rear view of the edge connector of FIG. 10.
Figure 12:
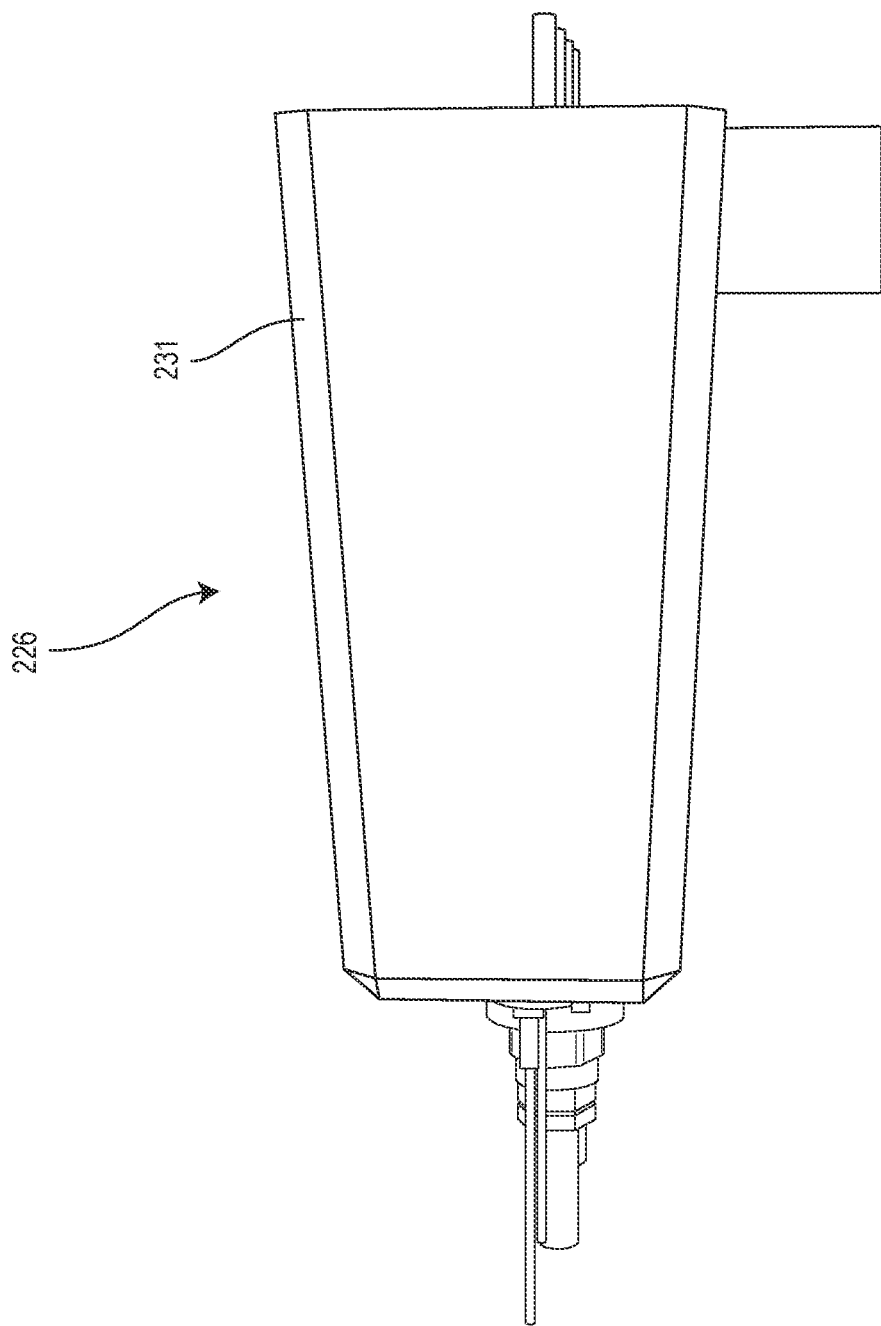
FIG. 12 is a side view of the edge connector of FIG. 10.
Figure 13:
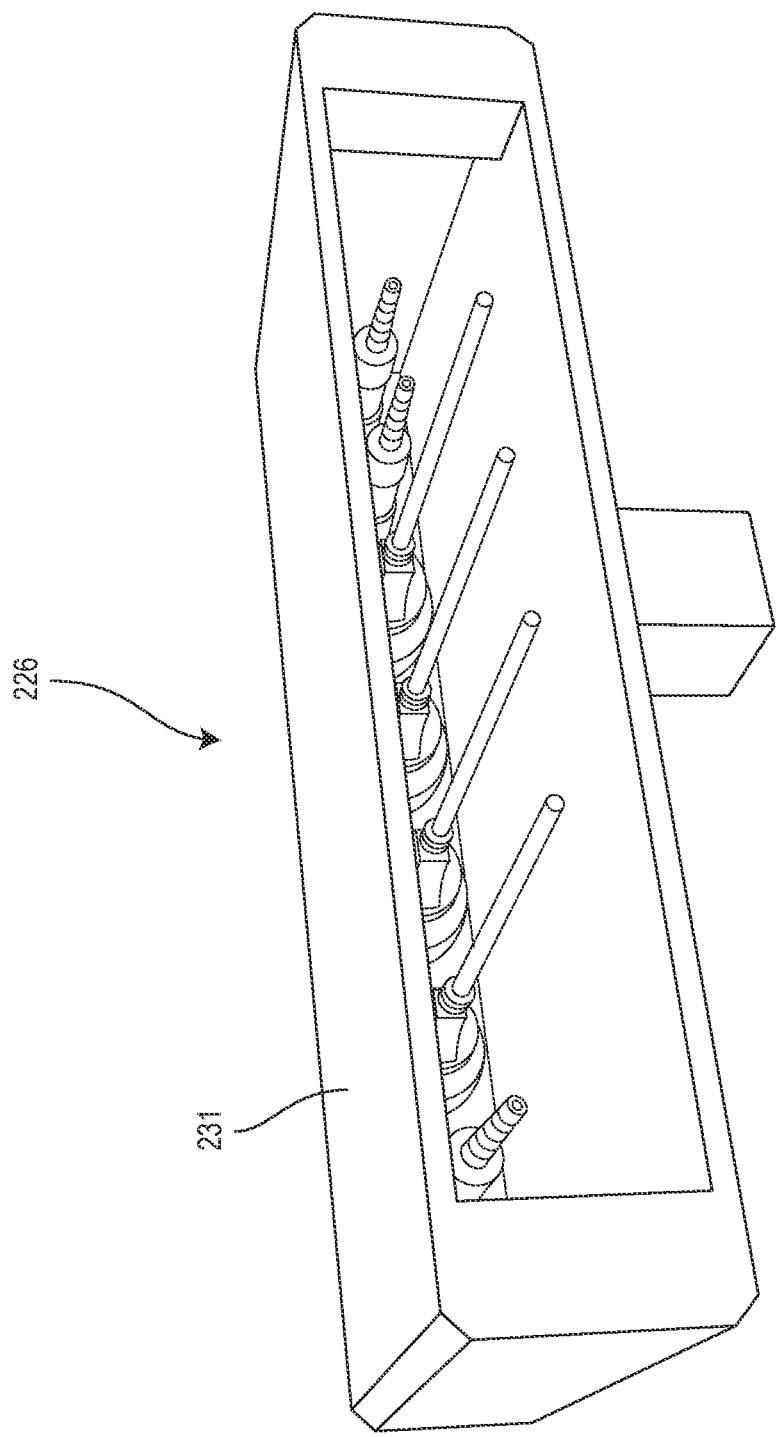
FIG. 13 is a front perspective view of the edge connector of FIG. 10 illustrating an interior space of the edge connector.

In one or more embodiments, and in accordance with the embodiments illustrated in FIG. 6, one or both of the loops 215, 216 overlap with one or more pockets 202, 204, 214 (and corresponding dowels, tie bars 213 or other load-transferring connectors once assembled), when considered in the XY plane corresponding to the width and length of the slab 200. In the illustrated embodiment, each of loops 215, 216 overlaps with multiple pockets 202, 204, 214 as they extend across the XY plane in the slab 200. Accordingly, the loops 215, 216 may provide valuable information regarding localized strain values responsive to loading both in regions of the slab 200 that are remote from and proximate or adjacent to load-transferring connectors. This information may help to distinguish between types of failures, if present, in the body of the slab 200 and/or the underlying sub-grade.

Also in accordance with the embodiments illustrated in FIG. 6 and as described above in connection with vehicle wheel paths, the loops 215, 216 preferably provide strain gauges and coverage on both sides of a lateral center of the slab 200 (that is, a middle of the slab along the width dimension or X axis corresponding to bisecting line 6A-6A). Moreover, the loops 215, 216 preferably extend along at least fifty percent (50%), at least seventy-five percent (75%), or at least eighty-five percent (85%) of the overall length of the slab 200 (along the longitudinal axis Y), considering the precast length of the slab 200 and not considering any buffering substances or load-transferring devices incorporated at installation. In the illustrated embodiment, the loops 215, 216 extend along approximately ninety percent (90%) of the overall length of the slab 200. Additional or alternative methods for optimizing sensor element loop positions are described in more detail above.

The slab 200 of FIGS. 6-9 includes grout ports 218 extending between top and bottom surfaces (see FIGS. 7-8) and lifting elements or receivers 220 (offset from the grout ports 218 and configured for receiving hooks or the like for lifting during installation and removal) proximate each corner of the slab 200. The slab 200 also includes a router port 222 and ethernet cables 224 extending between the router port 222 and each of the grout ports 218. The ethernet cables 224 each terminate in a terminator/connector 225 accessible via the grout ports 218 (see FIG. 8). Another embodiment of the terminator/connector 225 is discussed in more detail in connection with FIGS. 14A-E and referred to as a connector terminal 234. The ethernet cables 224 provide electronic communication between the grout ports 218 and the router port 222. The router port 222 and the grout port 218 may each provide interfaces for use with external communication elements. The FOSS interface cables 215, 216 may communicate raw sensor data to embedded, remote and/or adjacent processing elements via the router port 222, and the ethernet cables 224 may carry data between the remote or adjacent processing elements and the grout port 218.

Exemplary Embodiment of Communication Port(s)

Turning now to FIGS. 10-13, an exemplary edge connector 226 is illustrated that may be used as or in conjunction with and/or for forming communication ports 50 and/or router port(s) 222 described above. The edge connector 226 is an element and/or is used in formation of slab(s) 10, 200 according to embodiments of the present invention that allows the termination of cable and wire connections at the edge of a slab 10, 200. This ensures that the cable and wire components inside the slab(s) 10, 200 are terminated at the boundary of the slab(s) 10, 200, leaving no "leads", "pigtails", or other cable and wire extended beyond the body of the slab(s) 10, 200. The edge connector 226 may be used to form terminals that terminate internal cable(s) and/or wire(s) into a connection (e.g., a plug or socket).

Terminating such cable(s) and wire(s) at the edge of a slab provides several benefits, not the least of which is that the enabled intermediary connection between the slab and a secondary connection (whether a control center, a junction box, or other power or networking element) can be installed during or after the installation of the slab itself. All or part of the edge connector 226 and/or individual terminals, plugs and/or sockets it houses may also be replaced during or after servicing the slab 10, 200 or an adjacent section of pavement. In case of damage to such intermediary connection elements, for example from deterioration, malfunction, severance during a utility operation, or tampering, one or more of the intermediary connection elements may be replaced without requiring the replacement of the slab 10, 200 more generally.

By terminating the cable and wire at the edge of the slab 10, 200, the slab 10, 200 is resilient to any damage to cable that lies outside the body of the slab 10, 200.

The edge connector 226 may be left in the pavement slab 10, 200 once the slab 10, 200 is finished, and thus consumed by the production of the pavement slab 10, 200. Alternatively, it may be removed once the slab 10, 200 is finished, and thus a single edge connector 226 molding element can form multiple edge connector 226 recesses in multiple pavement slabs 10, 200. In this embodiment, we will consider an edge connector 226 that acts as a molding element that is removed after fabricating the slab 10, 200.

The edge connector 226 is shaped in such a way to support termination of a plurality of cable and wire elements at the edge of the pavement slab 10, 200. In this example, the edge connector 226 terminates four Ethernet connections 228 (e.g., see cables 224 of FIG. 6) and four fiber optic connections 230 (e.g., see terminal ends of loops 215, 216 of FIG. 6). The edge connector 226 is molded in such a way that each terminator is attached to the edge connector 226, and each terminator can be capped, and thus not connected to an intermediary connecting cable or wire, or connected and thus have the intermediary connecting cable or wire attached. In this embodiment we will consider the use of the edge connector 226 with the terminators capped.

While it is possible for the edge connector 226 terminators to be present on any internal face of the edge connector 226, including the sides, top, and bottom, in this embodiment it is assumed that the terminators are present on the interior side of the edge connector 226.

The edge connector 226 locks to each of the terminators 228, 230 using a lock ring, which can be a clip, a screw-type, a pin-type, or any other type of locking system that locks the terminator 228, 230 to the edge connector 226. This holds the internal cable and wire and the terminator 228, 230 in the correct location in the edge connector 226 during forming. After forming, the locking system is released so that the terminator element 228, 230 is no longer connected to the edge connector 226 element.

Once the locking system is released from the terminators 228, 230, the edge connector 226 may be extracted from the paving system, while the terminators 228, 230 stay in place, formed into the solid body of the pavement slab 10, 200. The ability to extract the edge connector 226 once forming is complete allows a single edge connector 226 mold to be reused for the production of multiple paving slabs 10, 200.

The edge connector 226 forms a recess within the edge of the slab 10, 200, and the terminators 228, 230 reside at the back of the recession (i.e., the terminals preferably do not protrude from the side of the slab 10, 200). The recess is preferably configured such that an exterior connector that is connected to the terminals or terminators 228, 230 is recessed into the slab 10, 200 deep enough that the exterior connector also does not extend beyond the vertical face of the side of the slab 10, 200. This ensures that even when the interconnections are in place, the vertical face of the side of the slab 10, 200 forms a smooth plane when adjacent to another section of pavement, and the connector elements do not protrude beyond that smooth plane to interfere with the interface to the adjacent pavement (or other material such as curb and gutter, shoulder, earthworks, foundations, etc.).

The edge connector 226 provides a routing element that directs intermediary connection cable and wire into a conduit, so that the intermediary cable and wire can be routed through a conduit to a receptacle where the intermediary cable and wire terminate, whether a control center, junction box, or other terminus. The routing element is shaped such that it can gather the cable and wire resulting from the connections at the edge connector 226, and direct said cable and wire into the conduit.

The edge connector 226 is preferably configured to form environmentally secure connections on both internal and external sides of the edge connector 226, such that an environmentally secure connection remains within the solid body of the pavement after casting, protecting the connection from any intrusion of pavement materials or environmental contamination such as water seeping through the paving material. The edge connector 226 preferably provides an environmentally secure connection on the exterior side of the connection as well, so that the intermediary connector is also environmentally secured against debris, paving materials, or environmental contamination.

It may also be preferable, as noted above, to remove the edge connector 226 (e.g., in embodiments where it acts as a molding element) once fabrication of a pavement slab 10, 200 is completed. Such embodiments of the edge connector 226 (see FIGS. 10-13) may include a shell 231 that tapers inward (i.e., into the slab when assembled thereto) such that the shell/molding element 231 may be removed from the pavement slab 10, 200 after fabrication (i.e., after the body of the slab 10, 200 cures). The actual degree of taper, or "draft", may depend on the design of the edge connector 226 and the paving slab 10, 200, but a value between 1/16th of an inch per inch of convex length may be sufficient.

Further, it is preferable that all or most of the surfaces that contact paving materials of the slab 10, 200 during formation present profiles that taper to some extent toward the interior of the slab 10, 200, to reduce resistance to removal after formation. Put another way, the edge connector 226 may be convex in other of its elements, growing narrower in each dimension that contacts paving materials of the slab 10, 200 along the direction of recession into the pavement, such that few or no angle(s) of edge connector 226 surfaces that contact paving materials are larger than any element of the edge connector 226 in the direction of the exterior. By maintaining such a convex shape, the edge connector 226 may improve its capacity to be removed after fabrication is completed.

It is apparent from the convex design of the preferred removable embodiment of the edge connector 226 that the cavity developed by such an embodiment of the edge connector 226 within the pavement is preferably concave, such that the concavity is continually decreasing as it moves to the interior of the pavement and increasing as it moves to the exterior of the pavement, and such that the dimension of the concavity is larger towards the opening and smaller towards the interior.

In furtherance of the removability of this embodiment of the edge connector 226, the edge connector 226 may be gripped mechanically and/or manually to facilitate its removal. Various methods may be utilized for such removal. One method is to include a hand grip at the exterior edge of the edge connector's shell 231, so that it can be gripped and pulled. Another method is to incorporate a plug with a threaded element embedded in the shell 231, such that a bolt can be inserted into the threaded element and twisted for threaded connection therewith, causing the bolt to drive through the edge connector shell 231 wall and into the bordering interior wall surface of the paving slab 10, 200. As the bolt further extends in a threading action, its engagement with the bordering interior wall of the slab drives the edge connector shell 231 backwards and out of the recess it formed. A similar method is accomplished by using a threaded element that threads to a bar which can be pulled manually or mechanically.

It is apparent from this description that hand grips or threaded elements may be incorporated in a multiplicity of locations along the shell 231 of the edge connector 226 to improve the ability and selectability of gripping or mechanical force locations to improve the capacity to remove the edge connector 226.

The edge connector 226 may also include a bracing system for the shell 231 while within the convex cavity to ensure that the paving materials cast around the shell's 231 external dimensions do not move, shift, displace, crush, or deform the shell 231 during the forming process.

In order to prevent the edge connector 226 from moving during the forming process, it is also anticipated that edge connector 226 may be connected to a corresponding casting table, whether by means of a clamp, adhesive, pins, or threaded elements that allow the edge connector 226 to screw, bolt, or otherwise be temporarily attached to a plate or face of the casting table.

The edge connector 226 may be installed on any face of the paving slab 10, 200, or multiple faces of the paving slab 10, 200, including to any or all of vertical, horizontal, top, bottom or side faces. In this embodiment it is assumed that the edge connector 226 is installed in one or more vertical faces along one or more sides of the paving slab 10, 200. But this does not preclude the edge connector 226 being installed in the top or bottom of the paving slab 10, 200 under some circumstances.

Exemplary Embodiment of Expansion Ports

The edge connector 226 provides a terminus for cable and wire present in the body of the pavement slab 10, 200. Such cables and wires are preferably embedded in the slab 10, 200, and extend to other terminuses along other portions of the slab 10, 200. The other terminuses may comprise other receivers or edge connectors 226 at different locations along the slab 10, 200. In this manner, the edge connector 226 may act as a pass-through to deliver a cable or wire connection across a paving slab 10, 200, and a receiver associated with another terminus of the cable or wire may be positioned inside the body of the paving slab 10, 200. In this embodiment we will discuss such a receiver, comprising an element internal to the paving slab and referred to for ease of reference as an "expansion port" 232. An embodiment of the expansion port 232 is discussed above in connection with grout ports 218 and terminators/connectors 225.

The expansion port 232 may correspond to another connector terminal within the paving slab 10, 200, which may be independent or connected to the edge connector 226. The expansion port 232 may include a connector terminal 234 positioned in a vertical cavity 236 in the paving slab 10, 200. The vertical cavity 236 may be used for lifting, leveling, and/or grouting the pavement slab 10, 200, or for other purposes not described here. The expansion port 232 may provide a connector terminal 234 recessed in the pavement slab 10, 200 adjacent to the vertical cavity 236 at some location. For example, a connector terminal 234 may be embedded in a sidewall defining such a vertical cavity 236 (e.g., serving as a grout port 218; see FIG. 8). A lifting receiver (not shown) may also be embedded in the sidewall. Leveling elements (not shown) may also be housed within the cavity 236 and/or embedded in the sidewall.

The expansion port 232 may provide an environmentally secure connection on the interior, where the connector terminal 234 resides in the solid body of the pavement slab 10, 200 and is embedded in the sidewall defining the cavity 236. In one or more embodiments (see FIGS. 14A-E), the sidewall defining the cavity 236 may define a general cylindrical profile, but may include a recessed portion in which the connector terminal 234 is embedded. The recessed portion may define a horizontal cavity 238 recessed from the general vertical cavity 236 profile and providing space into which an environmentally secure external connector may be introduced for establishing electronic communication at the embedded connector terminal 234 without the external connector protruding into the vertical cavity 236. In this manner, an element can be connected to the expansion port 232 using an environmentally secure connection, without said connection protruding into the vertical cavity 236. If the external connector does not enable external wireless communication with the wire or cable embedded in the slab 10, 200, but instead is joined to a cable or wire extending externally from the slab 10, 200, it is noted that such a cable or wire is generally of much smaller profile than the external connector itself, allowing the benefit of an expansion port 232 recessed from the vertical cavity 236 to be realized.

Moreover, embodiments of the present invention may also include an expansion module 240. An expansion module 240 may comprise one or more electronic components, such as a sensor module and/or communications module (e.g., a wireless router). The expansion module 240 may be inserted into the vertical cavity 236 and may connect to the expansion port 232 and/or the connector terminal 234 thereof. The space of the vertical cavity 236 available for the expansion module 240 may not occupied by the connector inside the expansion port 232.

The expansion module 240 may include and/or be in wired connection with a connection cable plugged into the connection terminal 234 of the expansion port 232. The expansion module 240 may be recessed into the vertical cavity 236. The vertical cavity 236 may be filled with a material in order to conceal and protect the expansion module 240.

In some cases, the expansion port 232 may not be used during or immediately following the initial installation of the pavement, and in such cases the expansion port 232 may have a plug (not shown) inserted that seals the expansion port 232 from the vertical cavity 236. The vertical cavity 236 may also be filled with some material in order to conceal and protect the expansion port 232. In the event that the expansion port 232 needs to be accessed, the vertical cavity 236 may be excavated, and the expansion port plug removed. Thereafter, an expansion module may be plugged into the connection terminal 234 of the expansion port 232 and inserted into the vertical cavity 236, and the vertical cavity 236 may be filled.

Having now described the features, discoveries and principles of the general inventive concept, the manner in which the general inventive concept is constructed and used, the characteristics of the construction, and advantageous, new and useful results obtained; the new and useful structures, devices, tools, elements, arrangements, parts and combinations, are set forth in the appended claims.

It is also to be understood that the following claims are intended to cover all of the generic and specific features of the general inventive concept herein described, and all statements of the scope of the general inventive concept which, as a matter of language, might be said to fall therebetween.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A pavement slab comprising:
a body comprising pavement material;
a grid reinforcement layer embedded in the body; and
a plurality of strain gauges attached to the reinforcement layer.

2. The pavement slab of claim 1,
the plurality of strain gauges comprising a strain sensor array configured to detect a plurality of strains on the body resulting from traffic movement across the top surface of the body.

3. The pavement slab of claim 2, wherein the strain sensor array includes an optical fiber sensor comprising an optical fiber with a plurality of fiber Bragg gratings spaced apart axially along the optical fiber.

4. The pavement slab of claim 2, wherein the body has a top surface and a plurality of side surfaces at least partly cooperatively defining the body, the reinforcement layer and the strain sensor array being positioned within the body.

5. The pavement slab of claim 4, wherein the strain sensor array is distributed across at least fifty percent (50%) of a longitudinal length of the pavement slab.

6. The pavement slab of claim 5, wherein the strain sensor array is distributed across both sides of a lateral center of the body.

7. The pavement slab of claim 1, wherein the body has a top surface and a side surface at least partly cooperatively defining the body, the side surface defining a cavity extending from the side surface into the body, further comprising a load-transferring connector within the cavity extending from the side surface into a neighboring structure.

8. The pavement slab of claim 7, wherein the plurality of strain gauges is distributed so as to at least partly overlap with the cavity.

9. The pavement slab of claim 1, wherein at least some of the plurality of strain gauges are embedded in a bottom half of the modular pavement slab.

10. The pavement slab of claim 9, further comprising a second reinforcement layer embedded in a top half of the modular pavement slab.

11. The pavement slab of claim 1, wherein the reinforcement layer comprises a rebar grid.

12. The pavement slab of claim 1, wherein the reinforcement layer comprises one or more of a fiberglass reinforcement mat, a geotechnical mat, and a carbon fiber mat.

13. The pavement slab of claim 1, wherein the plurality of strain gauges is laminated to the reinforcement layer.

14. The pavement slab of claim 1, wherein the pavement material is formed in a cast-in-place installation.

15. The pavement slab of claim 1, wherein the pavement material is precast for installation.

16. The pavement slab of claim 1, wherein the pavement material comprises concrete.

17. The pavement slab of claim 1, wherein the plurality of strain gauges comprises a strain sensor array including a first optical fiber sensor having a long dimension extending in a direction of travel.

18. The pavement slab of claim 1, wherein the plurality of strain gauges comprises first and second optical fiber sensors each forming a loop having a long dimension extending in a direction of travel.

19. The pavement slab of claim 1, further comprising a sensor processor configured to receive input from the plurality of strain gauges and to determine a plurality of corresponding time-varying strain values indicating a strain experienced over time in one or more regions of the body.

20. The pavement slab of claim 19, wherein the sensor processor is housed in a server remote from the pavement slab.

* * * * *